US011120296B2

(12) United States Patent
Dabeer et al.

(10) Patent No.: US 11,120,296 B2
(45) Date of Patent: Sep. 14, 2021

(54) SYSTEMS AND METHODS FOR MAPPING BASED ON MULTI-JOURNEY DATA

(71) Applicant: QUALCOMM Incorporated, San Diego, CA (US)

(72) Inventors: Onkar Jayant Dabeer, Redmond, WA (US); Kiran Somasundaram, San Diego, CA (US); Radhika Dilip Gowaikar, San Diego, CA (US); Ravi Teja Sukhavasi, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 161 days.

(21) Appl. No.: 16/375,761

(22) Filed: Apr. 4, 2019

(65) Prior Publication Data

US 2019/0236405 A1 Aug. 1, 2019

Related U.S. Application Data

(63) Continuation of application No. 15/620,167, filed on Jun. 12, 2017, now Pat. No. 10,296,812.
(Continued)

(51) Int. Cl.
*G06K 9/00* (2006.01)
*G06K 9/62* (2006.01)
(Continued)

(52) U.S. Cl.
CPC .......... *G06K 9/6219* (2013.01); *G01C 21/30* (2013.01); *G01C 21/32* (2013.01);
(Continued)

(58) Field of Classification Search
CPC combination set(s) only.
See application file for complete search history.

(56) References Cited

U.S. PATENT DOCUMENTS 7,512,487 B1 3/2009 Golding et al.
8,620,532 B2 12/2013 Curtis et al.
(Continued)

FOREIGN PATENT DOCUMENTS

DE 102015203016 A1 8/2016
KR 100923723 B1 10/2009
WO 2016099866 A1 6/2016

OTHER PUBLICATIONS

International Search Report and Written Opinion—PCT/US2017/058240—ISA/EPO—dated Jan. 22, 2018.
(Continued)

*Primary Examiner* — Alex Kok S Liew
(74) *Attorney, Agent, or Firm* — Qualcomm Incorporated

(57) ABSTRACT

A method performed by an apparatus is described. The method includes receiving a first set of object data corresponding to a first journey. The method also includes receiving a second set of object data corresponding to a second journey. The method further includes determining a similarity metric between the first set of object data and the second set of object data. The similarity metric indicates a distance between the first set of object data and the second set of object data for at least one object. The method additionally includes clustering the first set of object data and the second set of object data for the at least one object based on the similarity metric to produce at least one object cluster. The method also includes producing map data based on the at least one object cluster.

52 Claims, 11 Drawing Sheets

Related U.S. Application Data

(60) Provisional application No. 62/442,404, filed on Jan. 4, 2017.

(51) Int. Cl.
| | |
|---|---|
| *G01C 21/32* | (2006.01) |
| *G01C 21/36* | (2006.01) |
| *G01C 21/30* | (2006.01) |
| *G06T 17/05* | (2011.01) |

(52) U.S. Cl.
CPC ..... *G01C 21/3602* (2013.01); *G06K 9/00664* (2013.01); *G06K 9/00798* (2013.01); *G06K 9/00818* (2013.01); *G06K 9/6215* (2013.01); *G06K 9/6223* (2013.01); *G06K 9/6247* (2013.01); *G06T 17/05* (2013.01)

(56) References Cited

U.S. PATENT DOCUMENTS

| | | |
|---|---|---|
| 10,248,124 B2 | 4/2019 | Bellaiche |
| 2005/0177303 A1 | 8/2005 | Han |
| 2009/0150024 A1 | 6/2009 | Kojima et al. |
| 2009/0228204 A1* | 9/2009 | Zavoli ............... G01S 19/49 701/532 |
| 2012/0059789 A1 | 3/2012 | Sakai et al. |
| 2013/0158855 A1 | 6/2013 | Weir et al. |
| 2014/0012494 A1 | 1/2014 | Cudak et al. |
| 2015/0112741 A1 | 4/2015 | Mason et al. |
| 2015/0285639 A1 | 10/2015 | Basalamah et al. |
| 2016/0123743 A1* | 5/2016 | Sisbot ............... G01C 21/3461 701/538 |
| 2016/0189004 A1 | 6/2016 | Anastassov et al. |
| 2016/0356600 A1 | 12/2016 | Fan et al. |
| 2017/0031359 A1 | 2/2017 | Shashua et al. |
| 2017/0276504 A1* | 9/2017 | Lu ............... G08G 1/096838 |
| 2018/0189601 A1 | 7/2018 | Dabeer et al. |

OTHER PUBLICATIONS

Blanke U., et al., "Crowdsourced Pedestrian Map Construction for Short-Term City-Scale Events", 2014, 7 Pages.

Bonetti P., "HERE and Mobileye: crowdsourced HD mapping for autonomous cars", Dec. 30, 2016, Retrieved from internet on May 26, 2019, https://360.here.com/2016/12/30/here-and-mobileye-crowd-sourced-hd-mapping-for-autonomous-cars/, pp. 1-3.

Davies C., "HERE and Mobileye team on self-healing maps for self-driving cars", Slash Gear, Dec. 30, 2016, Retrieved from internet on May 26, 2019, https://www.slashgear.com/here-and-mobileye-team-on-self-healing-maps-for-self-driving-cars-30469482/, pp. 1-6.

"Enabling Autonomous", Mobileye, May 26, 2019, Retrieved from Internet on https://www.mobileye.com/future-of-mobility/mobileye-enabling-autonomous/, pp. 1-3.

"Lucid Motors chooses Mobileye as partner for autonomous vehicle technology", Green Car Congress, Dec. 30, 2016, Retrieved from internet on May 26, 2019, https://www.greencarcongress.com/2016/12/20161230-lucid.html, pp. 1-7.

Vijayenthiran V., "HERE and Mobileye join forces to create highly-detailed maps for self-driving cars", Dec. 30, 2016, Retrieved from internet on May 26, 2019, https://www.motorauthority.com/news/1108069_here-and-mobileye-join-forces-to-create-highly-detailed-maps-for-self-driving-cars, pp. 1-3.

* cited by examiner

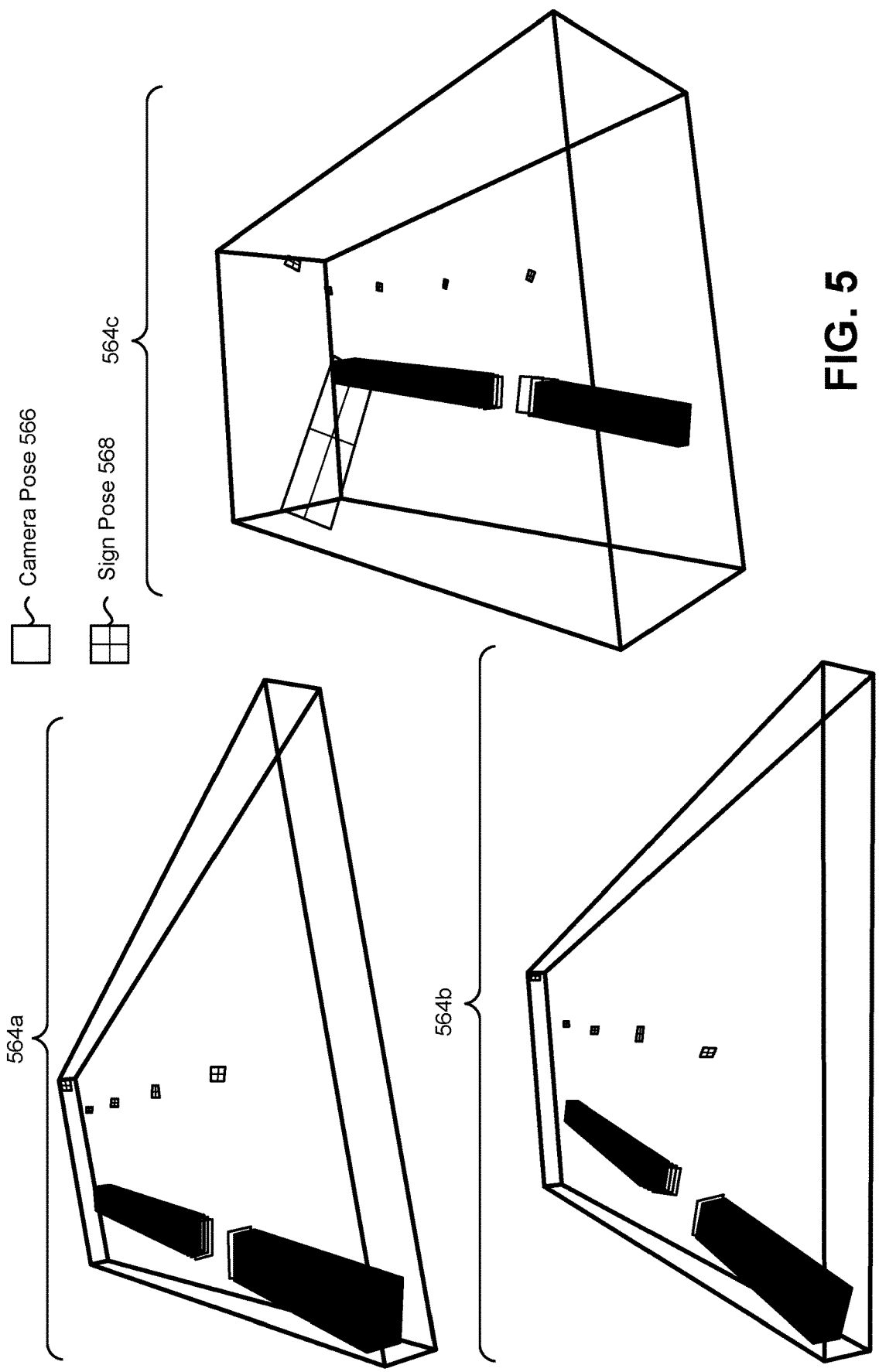

SYSTEMS AND METHODS FOR MAPPING BASED ON MULTI-JOURNEY DATA

RELATED APPLICATIONS

This application is a continuation of U.S. patent application Ser. No. 15/620,167, filed Jun. 12, 2017, for "SYSTEMS AND METHODS FOR MAPPING BASED ON MULTI-JOURNEY DATA" which claims priority to U.S. Provisional Patent Application Ser. No. 62/442,404, filed Jan. 4, 2017, for "SYSTEMS AND METHODS FOR MAPPING AN OBJECT BASED ON MULTI-JOURNEY DATA," all of which are assigned to the assignee hereof and hereby expressly incorporated by reference herein.

FIELD OF DISCLOSURE

The present disclosure relates generally to electronic devices. More specifically, the present disclosure relates to systems and methods for mapping based on multi-journey data.

BACKGROUND

Some electronic devices (e.g., cameras, video camcorders, digital cameras, cellular phones, smart phones, computers, televisions, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, drones, healthcare equipment, set-top boxes, etc.) capture and/or utilize images. For example, a smart phone may capture and/or process still and/or video images. The images may be processed, displayed, stored and/or transmitted. The images may portray a scene including a landscape and/or objects, for example.

In some cases, it may be difficult to locate objects. For example, it may be difficult to locate objects based on images. As can be observed from this discussion, systems and methods that improve locating objects may be beneficial.

SUMMARY

A method performed by an apparatus is described. The method includes receiving a first set of object data corresponding to a first journey. The method also includes receiving a second set of object data corresponding to a second journey. The method further includes determining a similarity metric between the first set of object data and the second set of object data. The similarity metric indicates a distance between the first set of object data and the second set of object data for at least one object. The method additionally includes clustering the first set of object data and the second set of object data for the at least one object based on the similarity metric to produce at least one object cluster. The method also includes producing map data based on the at least one object cluster. The object data may include object pose information. Producing the map data may include refining map data based on the at least one object cluster.

The similarity metric may be based on an object type. The similarity metric may be determined for a sign object type. The method may also include determining a second similarity metric for a lane marker object type.

The first set of object data and the second set of object data may include sign data. The similarity metric may indicate a distance between points for a sign from different journeys.

The first set of object data and the second set of object data may include lane marker data. The similarity metric may indicate at least one of a minimum distance between the lane marker data from different journeys or between points of the lane marker data within an area.

Clustering the first set of object data and the second set of object data may include performing hierarchical clustering. Performing hierarchical clustering may include performing multiple different steps of clustering. A first step of clustering may include clustering based on a first distance parameter and a second step of clustering may include clustering based on a second distance parameter. The second distance parameter may be less than the first distance parameter.

Clustering the first set of object data and the second set of object data may include performing spectral clustering. Clustering may be performed within each of one or more association tiles.

The method may include performing bundle adjustment based on the at least one object cluster. The method may include transmitting the produced map data to at least one vehicle.

An apparatus is also described. The apparatus includes a memory and a processor coupled to the memory. The processor is configured to receive a first set of object data corresponding to a first journey. The processor is also configured to receive a second set of object data corresponding to a second journey. The processor is further configured to determine a similarity metric between the first set of object data and the second set of object data. The similarity metric indicates a distance between the first set of object data and the second set of object data for at least one object. The processor is also configured to cluster the first set of object data and the second set of object data for the at least one object based on the similarity metric to produce at least one object cluster. The processor is additionally configured to produce map data based on the at least one object cluster.

A non-transitory tangible computer-readable medium storing computer executable code is also described. The computer-readable medium includes code for causing an electronic device to receive a first set of object data corresponding to a first journey. The computer-readable medium also includes code for causing the electronic device to receive a second set of object data corresponding to a second journey. The computer-readable medium further includes code for causing the electronic device to determine a similarity metric between the first set of object data and the second set of object data. The similarity metric indicates a distance between the first set of object data and the second set of object data for at least one object. The computer-readable medium additionally includes code for causing the electronic device to cluster the first set of object data and the second set of object data for the at least one object based on the similarity metric to produce at least one object cluster. The computer-readable medium also includes code for causing the electronic device to produce map data based on the at least one object cluster.

An apparatus is also described. The apparatus includes means for receiving a first set of object data corresponding to a first journey. The apparatus also includes means for receiving a second set of object data corresponding to a second journey. The apparatus further includes means for determining a similarity metric between the first set of object data and the second set of object data. The similarity metric indicates a distance between the first set of object data and the second set of object data for at least one object. The apparatus additionally includes means for clustering the first set of object data and the second set of object data for the at least one object based on the similarity metric to produce at least one object cluster. The apparatus also includes means for producing map data based on the at least one object cluster.

BRIEF DESCRIPTION OF THE DRAWINGS

FIG. 5 is a diagram illustrating examples of single-journey triangulations;

DETAILED DESCRIPTION

Figure 1:
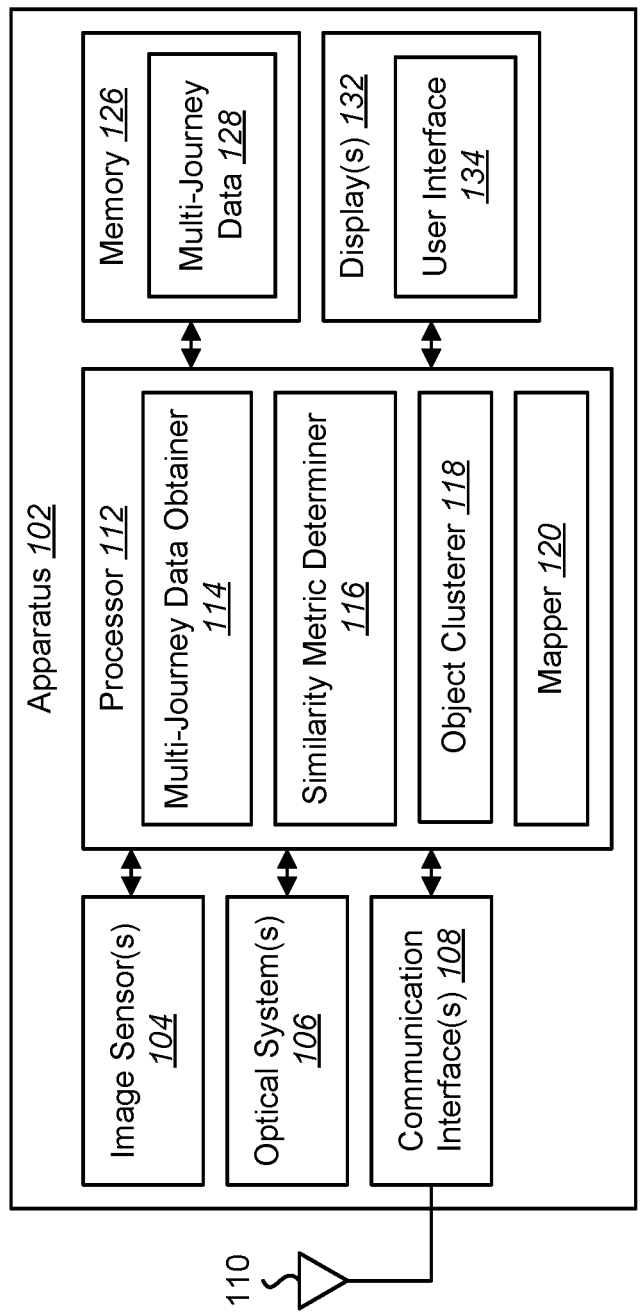
FIG. 1 is a block diagram illustrating one example of an apparatus in which systems and methods mapping based on multi-journey data may be implemented.

Some configurations of the systems and methods disclosed herein may relate to systems and methods for mapping based on multi-journey data. For example, some configurations may involve multi-journey association and refinement (e.g., optimization) for building precise three-dimensional (3D) maps using crowdsourced data. Some configurations may include multi-journey sign association and/or batch adjustment.

Autonomous apparatuses (e.g., vehicles, robots, etc.) may rely on precise 3D maps to localize themselves and obtain local semantic information such as speed limits. Some approaches build these maps with expensive precisely calibrated equipment and are difficult to maintain due to the dynamic nature of the information. For example, roads may change, road markings and traffic signs may be updated, and/or some signage (e.g., road work signs) may be temporary. Some configurations of the systems and methods disclosed herein may describe one or more procedures (e.g., a pipeline) for building precise 3D maps using crowd-sourced data (e.g., multiple journeys). For example, some configurations may take, as inputs, object location data (e.g., triangulator outputs) and related inputs from perception (e.g., detection) and positioning from multiple journeys (e.g., from the same vehicle at different times and/or from different vehicles). An output may be a map with objects (e.g., signs (a 6 degrees of freedom pose for each sign, for example) and lanes (3D splines, for example)). Some configurations may include incremental map updates and/or joint multi-journey processing.

In some approaches, 3D map creation may include two functions: multi journey association and refinement (e.g., optimization) of the 6 degrees of freedom (DOF) landmark poses. Some configurations of the systems and methods disclosed herein may include an incremental update of existing maps and/or cold start or periodic map creation using all data available at the time. Data from multiple journeys (using multiple cars and/or times (e.g., days), for example) may be collected in a repository (e.g., a central repository in the cloud). The data may include landmark detections in image (e.g., camera) frames, relevant image features, and/or 6 DOF camera poses.

Multi-journey association may include estimating the number of true landmarks in the map to be generated and/or clustering all the data. The clustering of landmarks may depend on the type of landmark. Some approaches may include creating distance metrics and/or using the distance metrics for spectral clustering and/or hierarchical clustering.

An example of clustering traffic signs is given as follows. In a first round of clustering for traffic signs, for instance, semantic information may be used for partitioning the signs into clusters. For example, the shape of a sign (e.g., rectangle, diamond, etc.) may be used to partition the signs into clusters. In a second round of clustering, sign center-based distance metrics may be utilized to cluster signs from the first round clusters into geographically nearby clusters. This may correctly cluster signs that are not near other signs. In some cases, different signs that are geographically nearby, such as signs on a pole may incorrectly fall in one cluster. In a third round (e.g., final round), image features specific to the sign detections may be used to separate close-by signs (e.g., two cross street signs on the same pole).

An example of clustering traffic lanes is given as follows. For traffic lanes, one or more different metrics may be employed and/or multiple rounds of clustering may be used. For example, distance metrics between lane triangulations may include several individual metrics: longitudinal distance between two lane triangulations, lateral distance, and/or number of points within a threshold distance, etc. To create long chains of lane triangulations, multiple rounds of clustering may be used.

Once the data is clustered, the 6 DOF landmark poses may be refined (e.g., optimized) as well as camera parameters such as intrinsics and 6 DOF pose to best explain all the image level detections from all the data in the repository. This refinement (e.g., optimization) may lead to better accuracy and/or may make the map resilient to calibration errors and biases in camera positions in one journey.

One or more multi-journey association options may be implemented in some configurations of the systems and methods disclosed herein. For example, joint multi-journey association using all data up to a current time may be implemented. Incremental multi-journey association using a map estimate at current time may be implemented. In some approaches, joint multi-journey association may be utilized during cold-start (without previous data, for example). Once the existing high definition (HD) map reaches a confidence level, incremental multi-journey association may be used on a frequent basis. Occasional joint multi-journey association may be performed to reduce and/or eliminate any incremental multi-journey association inaccuracies.

For incremental updates to the map (such as a lane closure sign that is put in temporarily, for example) the landmark triangulations along with corresponding confidence measure(s) may be compared to the existing map, local optimizations around that landmark may be performed, and/or the map may be updated. To ensure errors due to many incremental updates do not accumulate, the full map may be built periodically using all data available at that point, for example.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an apparatus 102 in which systems and methods mapping based on multi-journey data may be implemented. For instance, the apparatus 102 may be configured to locate one or more objects in an environment (e.g., three dimensional (3D) map) based on object location data from multiple journeys (e.g., multiple vehicles, multiple trips, and/or multiple times, etc.). Examples of the apparatus 102 include electronic devices, servers, computers (e.g., desktop computers, laptop computers, etc.), network devices, cameras, video camcorders, digital cameras, cellular phones, smart phones, tablet devices, vehicles, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), gaming consoles, appliances, etc. The apparatus 102 may include one or more components or elements. One or more of the components or elements may be implemented in hardware (e.g., circuitry), a combination of hardware and software (e.g., a processor with instructions), and/or a combination of hardware and firmware.

In some configurations, the apparatus 102 may be a network device (e.g., server, cloud device, etc.) that communicates with one or more vehicles. In some approaches, one or more of the vehicles may be an autonomous vehicle, a self-driving vehicle, and/or may have an Advanced Driver Assistance System (ADAS), etc. For example, the apparatus 102 may receive information (e.g., journey data, object detection data, pose data, raw image data, object data, etc.) from one or more vehicles. The apparatus 102 may determine mapping information (e.g., 3D mapping data, refined object location data, etc.), which the apparatus 102 may provide to one or more vehicles.

Additionally or alternatively, the apparatus 102 may be a vehicle configured to produce mapping information. For example, the apparatus 102 may determine mapping information based on multiple journeys. In some configurations, the apparatus 102 may be a vehicle in communication with one or more other vehicles. For example, the apparatus 102 may receive information (e.g., journey data, object detection data, pose data, raw image data, object data, etc.) from one or more vehicles and/or may send information to one or more vehicles (e.g., may share information). The apparatus 102 may produce and/or receive mapping information, which may be shared with one or more other vehicles.

In some configurations, the apparatus 102 may include a processor 112, a memory 126, one or more displays 132, one or more image sensors 104, one or more optical systems 106, and/or one or more communication interfaces 108. The processor 112 may be coupled to (e.g., in electronic communication with) the memory 126, display(s) 132, image sensor(s) 104, optical system(s) 106, and/or communication interface(s) 108. It should be noted that one or more of the elements illustrated in FIG. 1 may be optional. In particular, the apparatus 102 may not include one or more of the elements illustrated in FIG. 1 in some configurations. For example, the apparatus 102 may or may not include an image sensor 104 and/or optical system 106. Additionally or alternatively, the apparatus 102 may or may not include a display 132. Additionally or alternatively, the apparatus 102 may or may not include a communication interface 108 and/or antenna(s) 110.

In some configurations, the apparatus 102 may perform one or more of the functions, procedures, methods, steps, etc., described in connection with one or more of FIGS. 1-11. Additionally or alternatively, the apparatus 102 may include one or more of the structures described in connection with one or more of FIGS. 1-11.

The communication interface(s) 108 may enable the apparatus 102 to communicate with one or more other apparatuses (e.g., electronic devices, vehicles, etc.). For example, the communication interface(s) 108 may provide an interface for wired and/or wireless communications. In some configurations, the communication interface(s) 108 may be coupled to one or more antennas 110 for transmitting and/or receiving radio frequency (RF) signals. Additionally or alternatively, the communication interface(s) 108 may enable one or more kinds of wireline (e.g., Universal Serial Bus (USB), Ethernet, etc.) communication.

In some configurations, multiple communication interfaces 108 may be implemented and/or utilized. For example, one communication interface may be a cellular (e.g., 3G, Long Term Evolution (LTE), CDMA, etc.) communication interface, another communication interface may be an Ethernet interface, another communication interface may be a universal serial bus (USB) interface, and yet another communication interface may be a wireless local area network (WLAN) interface (e.g., Institute of Electrical and Electronics Engineers (IEEE) 802.11 interface). In some configurations, the communication interface may send information to and/or receive information (e.g., image information, pose information, location information, object detection information, map information, object data, etc.) from another apparatus 102 or device (e.g., a vehicle, a smart phone, a camera, a display, a remote server, etc.).

In some configurations, the apparatus 102 may obtain one or more images (e.g., digital images, image frames, video, etc.). For example, the apparatus 102 may include the image sensor(s) 104 and the optical system(s) 106 (e.g., lenses) that focus images of scene(s) and/or object(s) that are located within the field of view of the optical system onto the image sensor. The optical system(s) 106 may be coupled to and/or controlled by the processor 112.

A camera (e.g., a visual spectrum camera or otherwise) may include at least one image sensor and at least one optical system. Accordingly, the apparatus 102 may be one or more cameras and/or may include one or more cameras in some implementations. In some configurations, the image sensor(s) 104 may capture the one or more images (e.g., image frames, video, still images, burst mode images, stereoscopic images, etc.). In some configurations, the image sensor(s) 104 may capture the one or more images. In some implementations, the apparatus 102 may include a single image sensor 104 and/or a single optical system 106. For example, a single camera with a particular resolution (e.g., video graphics array (VGA) resolution, 1280×800 pixels, etc.), at a particular frame rate (e.g., 30 frames per second (fps), 60 fps, 120 fps, etc.) may be utilized. In other implementations, the apparatus 102 may include multiple optical system(s) 106 and/or multiple image sensors 104. For example, the apparatus 102 may include two or more lenses in some configurations. The lenses may have the same focal length or different focal lengths.

Additionally or alternatively, the apparatus 102 may request and/or receive the one or more images from another apparatus or device (e.g., vehicle camera(s), one or more external cameras coupled to the apparatus 102, a network server, traffic camera(s), etc.). In some configurations, the apparatus 102 may request and/or receive the one or more images via the communication interface. For example, the apparatus 102 may or may not include camera(s) (e.g., image sensor(s) 104 and/or optical system(s) 106) and may receive images from one or more remote devices (e.g., vehicles).

One or more of the images (e.g., image frames) may include one or more scene(s) and/or one or more object(s). In some cases, the image(s) may include one or more objects (e.g., landmarks, road signs, lane markers, traffic lights, construction zone cones, barriers, light poles, road markings, stationary objects, etc.).

In some examples, the image sensor(s) 104 and/or the optical system(s) 106 may be mechanically coupled to the apparatus 102 or to a remote apparatus (e.g., may be attached to, mounted on, and/or integrated into the body of a vehicle, the hood of a car, a rear-view mirror mount, a side-view mirror, a bumper, etc., and/or may be integrated into a smart phone or another device, etc.). The image sensor(s) 104 and/or optical system(s) 106 may be linked to the apparatus 102 via wired and/or wireless link. For example, the image sensor(s) 104 and/or optical system(s) 106 may be hardwired to a control mechanism (e.g., processor 112) in a vehicle or information captured by the image sensor(s) 104 and/or optical system(s) 106 may be wirelessly transmitted (e.g., streamed or otherwise wirelessly transported) to the control mechanism (e.g., processor 112).

The memory 126 may store instructions and/or data. The processor 112 may access (e.g., read from and/or write to) the memory 126. Examples of instructions and/or data that may be stored by the memory 126 may include multi-journey data 128, image data, object detection data, object location data, 2D object location data (e.g., pixel data), feature points, key points, corners, object mapping data, 3D object location data, camera pose information, road normal vector data, etc., image obtainer instructions, multi-journey data obtainer 114 instructions, similarity metric determiner 116 instructions, object clusterer 118 instructions, mapper 120 instructions, and/or instructions for one or more other elements, etc.

In some configurations, the apparatus 102 may include an image data buffer (not shown). The image data buffer may buffer (e.g., store) image data from the image sensor(s) 104 and/or external camera(s). The buffered image data may be provided to the processor 112.

In some configurations, the apparatus 102 may include one or more displays 132. In some approaches, images (e.g., scenes and/or objects) that are being captured by the image sensor(s) 104 may be presented on the display 132. In some configurations, these images may be displayed in rapid succession at a relatively high frame rate so that, at any given moment in time, the objects that are located within the field of view of the optical system 106 may be presented on the display 132. The one or more images obtained by the apparatus 102 may be one or more video frames and/or one or more still images. For example, the display(s) 132 may be configured to output a view of one or more objects (e.g., signs, lane markers, landmarks, etc.).

The display(s) 132 may be integrated into the apparatus 102 and/or may be coupled to the apparatus 102. For example, the apparatus 102 may be virtual reality headset with integrated displays 132. In another example, the apparatus 102 may be a computer that is coupled to a virtual reality headset with the displays 132. In yet another example, the apparatus 102 may be a vehicle.

In some configurations, the apparatus 102 may present a user interface 134 on the display 132. For example, the user interface 134 may enable a user to interact with the apparatus 102. In some configurations, the display 132 may be a touchscreen that receives input from physical touch (by a finger, stylus, or other tool, for example). Additionally or alternatively, the apparatus 102 may include or be coupled to another input interface. For example, the apparatus 102 may include a camera facing a user and may detect user gestures (e.g., hand gestures, arm gestures, eye tracking, eyelid blink, etc.). In another example, the apparatus 102 may be coupled to a mouse and may detect a mouse click. In some configurations, one or more of the images described herein may be presented on the display 132 and/or user interface 134. In some configurations, the user interface 134 may enable a user to indicate preferences (e.g., view settings) and/or interact with the view.

In some configurations, the apparatus 102 (e.g., processor 112) may optionally be coupled to, be part of (e.g., be integrated into), include, and/or implement one or more kinds of devices. For example, the apparatus 102 may be implemented in a vehicle equipped with one or more cameras.

The processor 112 may be configured to implement one or more of the methods disclosed herein. For example, the processor 112 may be configured to produce object mapping data (e.g., object location information in a 3D map, object pose information, etc.).

The processor 112 may include and/or implement an image obtainer in some configurations. One or more image frames may be provided to the image obtainer. For example, the image obtainer may obtain images from one or more cameras (e.g., normal cameras, wide-angle cameras, fisheye cameras, stereoscopic cameras, etc.). For example, the image obtainer may receive image data from one or more image sensors 104, from one or more external cameras, and/or from one or more remote cameras (e.g., remote vehicle cameras). The images may be captured from one or multiple cameras (at different locations, for example). As described above, the image(s) may be captured from the image sensor(s) 104 included in the apparatus 102 or may be captured from one or more remote camera(s).

In some configurations, the image obtainer may request and/or receive one or more images. For example, the image obtainer may request and/or receive one or more images from a remote device (e.g., external camera(s), remote server(s), remote electronic device(s), remote vehicle(s), etc.) via the communication interface 108.

The processor 112 may include and/or implement a multi-journey data obtainer 114. The multi-journey data obtainer 114 may obtain (e.g., request and/or receive) data corresponding to multiple journeys (e.g., multi-journey data 128).

For example, the multi-journey data obtainer 114 may obtain object data, object detection information (e.g., one or more feature points, keypoints, two-dimensional (2D) object location data (in an image plane, for example), etc.), timestamps, object type (e.g., sign, rectangular sign, octagonal sign, triangular sign, circular sign, etc., lane marker, road markings, etc.)), object pose information (e.g., 2D sign parameters, 2D lane parameters, 3D sign parameters, 3D lane parameters, 3D location data, and/or orientation data, etc.), camera pose information (e.g., 6 DOF camera pose, camera location data, and/or orientation data, etc.), triangulation outputs, road normal vectors, vehicle location data, vehicle orientation data, raw data (e.g., raw image data and/or raw object detection data, etc.), etc. Object data (e.g., object pose information) may include object position data (e.g., 3D object position, 3D object translation, etc.) and/or object orientation data (e.g., 3D object rotation). In some configurations, object data (e.g., object pose information) may include camera pose information. The multi-journey data may correspond to multiple vehicles, to a single vehicle at multiple times, to multiple vehicles at multiple times, to multiple journeys traveled by one or more vehicles, etc. For example, the apparatus 102 may receive the multi-journey data 128 corresponding to multiple vehicles and/or to multiple journeys. In some configurations, the multi-journey data 128 may be obtained as data from individual journeys that is combined into multi-journey data 128. For example, one or more vehicles may collect data while traveling on individual journeys. The data from each individual journey may be provided to the apparatus 102.

In some configurations, the apparatus 102 (e.g., multi-journey data obtainer 114) may receive the multi-journey data 128 via the communication interface(s) 108. Additionally or alternatively, the apparatus 102 (e.g., multi-journey data obtainer 114) may obtain, receive, and/or produce the multi-journey data 128 based on performing one or more object location functions (e.g., triangulation, inter-frame object association, inter-frame sign association, mid-point determination, corner adjustment, sign pose adjustment, inter-frame lane marker association, normal vector estimation, spline fitting, spline parameter adjustment, etc.).

For example, the processor 112 may include and/or implement an inter-frame associator in some configurations. The inter-frame associator may associate one or more objects between frames (in a series of frames, for example) collected during a journey to produce two-dimensional object location data. In some configurations, the inter-frame associator may associate one or more objects between frames based on one or more object pixels (e.g., one or more pixels of an object in one or more images), one or more object features (e.g., feature points, keypoints, corners, center points, etc.), and/or one or more pixel camera positions (e.g., camera pose information corresponding to one or more pixels). In some configurations, the inter-frame associator may perform inter-frame association for one or more road signs. Additionally or alternatively, the inter-frame associator may perform inter-frame association for one or more lane markers. In some approaches (for lane marker pose estimation, for example), the processor 112 may estimate a road normal vector. In some configurations, the object location data (e.g., sign location data, sign pose data, lane marker location data, etc.) produced from inter-frame association may be stored, sent, and/or utilized as journey data (e.g., part of multi-journey data 128).

The processor 112 may include and/or implement a similarity metric determiner 116. The similarity metric determiner 116 may determine one or more similarity metrics between object data (e.g., 3D object location data and/or orientation data, etc.) corresponding to two or more journeys. The similarity metric may indicate a distance between objects from the object data. In some approaches, the similarity metric may be based on object type. For instance, different similarity metrics may be determined and/or utilized for different object types. For example, one kind of similarity metric may be utilized for a sign object type (e.g., road signs) and another similarity metric may be used for a lane marker object type (e.g., lane stripes).

In some configurations, the similarity metric may indicate one or more respective distances between respective point(s) (e.g., center points, corners, etc.) for sign objects from different journeys. Additionally or alternatively, a similarity metric may indicate a distance (e.g., minimum distance) between lane markers and/or points of lane markers (from different journeys, for instance). For example, the similarity metric may indicate a longitudinal distance between lane markers (e.g., lane triangulations), lateral distance, and/or number of points of lanes within an area (e.g., within a threshold distance, within a radial area, etc.). In some configurations, a kernel function may also be used. For example, the similarity metric may be based on the kernel function. The shape and size of a distance threshold may be controlled. More detail may be provided in relation to one or more of the Figures herein. In some configurations, the similarity metric may be based on pose information (e.g., 3D geometric information). For example, the similarity metric calculation may not factor in other types of information (e.g., color, image data, etc.).

An example of an approach for determining sign similarity metrics is given as follows. In particular, this approach shows a similarity metric between object locations (e.g., two signs from different journeys, two triangulation outputs, etc.). It should be noted that signs of different types (e.g., shapes) and/or lane markers may be clustered separately in some approaches.

In some configurations, a similarity metric may be within a range of values. For instance, a similarity metric may have a value in a range of [0, 1]. For example, 0 may indicate different objects and/or 1 may indicate a perfect match. In some approaches, sign observations (e.g., object location data) of the same shape and from different journeys may be expressed as $O_{s1}$ and $O_{s2}$. For instance, $O_{s1}$ may denote one or more points (e.g., corners, feature points, center point, 3D coordinate(s), etc.) for a first sign observation and $O_{s2}$ may denote one or more points (e.g., corners, feature points, center point, 3D coordinate(s), etc.) for a second sign observation. One example of a similarity metric is given in Equation (1).

$$S(O_{s1}, O_{s2}) = L\left(\frac{d(O_{s1}, O_{s2})}{d_c}\right) \qquad (1)$$

In Equation (1), S is the similarity metric (between $O_{s1}$ and $O_{s2}$, for example), $O_{s1}$ is a first sign observation (e.g., object location from a first journey), $O_{s2}$ is a second sign observation (e.g., object location from a second journey), L( ) is a kernel function, d( ) is a distance function, and $d_c$ is a distance parameter that implicitly controls the clustering radius (e.g., a larger $d_c$ clusters signs in a larger geographical area or a smaller $d_c$ clusters signs in a smaller geographical area). It should be noted that $d_c$ may be a tunable parameter. For example, a default $d_c$=5 meters (m), although $d_c$ may be fine-tuned to other values. In some configurations, $L(0)=1$ and $L(\infty)=0$, where $L(\ )$ may be a non-increasing function.

In some configurations, the distance function $d(\ )$ may be given as shown in Equation (2).

$$d(O_{s1}, O_{s2}) = \|\text{corners}(O_{s1}) - \text{corners}(O_{s2})\| \quad (2)$$

In Equation (2), corners( ) is a set of corners (e.g., 3D locations of sign corners) for a sign, and $\|\ \|$ denotes the norm.

In some configurations, the distance function $d(\ )$ may be alternatively given as shown in Equation (3).

$$d^2(O_{s1}, O_{s2}) = \|t(O_{s1}) - t(O_{s2})\|^2 + C\|R(O_{s1}) - R(O_{s2})\|^2 + D\|\text{size}(O_{s1}) - \text{size}(O_{s2})\|^2 \quad (3)$$

In Equation (3), t (e.g., translation t) denotes the position and R (e.g., rotation matrix R) denotes the orientation of the sign, C and D are constants (or coefficients) (e.g., selected and/or predetermined coefficients) that determine a relative weight and/or importance of the various factors, and size( ) is a sign size. It should be noted that other options (e.g., formulations) may be utilized for C, for D (where $D \geq 0$), and/or for $d(\ )$. It should be noted that $d(O_{s1}, O_{s2}) = \|t(O_{s1}) - t(O_{s2})\|$ may be a relatively robust measure if the sign triangulations are noisy.

In some configurations, the kernel function $L(u)$ may be given as shown in Equation (4).

$$L(u) = \exp(-K^*u^2) \quad (4)$$

In Equation (4), u is an input value for the kernel function, K is a tunable scaling factor, and exp( ) denotes an exponential function.

In some configurations, the kernel function $L(u)$ may be alternatively given as shown in Equation (5).

$$L(u) = \exp(-Ku) \quad (5)$$

In some approaches, a default $K=1$. Additionally or alternatively, the kernel function may have a "waterfall" near 1 and/or $L(u)$ may be an indicator in a range of $[0, 1]$.

An example of an approach for determining lane similarity metrics is given as follows. In particular, this approach shows a similarity metric between object locations (e.g., lane observations, etc.). In some configurations, lane marker observations may be expressed as $O_{l1}$ and $O_{l2}$. In some approaches, the lane marker observations may be expressed as splines (e.g., 3D splines). A distance function may be given as shown in Equation (6).

$$d(O_{l1}, O_{l2}) = \min \|x_i - y_j\|^2 \quad (6)$$

In Equation (6), $x_i$ and $y_j$ is a sampling of points on the lane markers (e.g., stripes), where the minimum is taken over i and j. This approach may allow chaining of lane markers (e.g., stripes).

Additionally or alternatively, points (in 3D world coordinates, for example) may be sampled on $O_{l1}$. In some configurations, the points may be evenly sampled along the spline. The points may be denoted $x_1, x_2, \ldots, x_M$. The points $y_1, y_2, \ldots, y_M$ may be the nearest corresponding points on $O_{l2}$. An alternative distance function may be given as shown in Equation (7).

$$d(O_{l1}, O_{l2}) = \frac{\sqrt{\sum_i^M \|x_i - y_i\|^2}}{M} \quad (7)$$

Another example of a similarity metric is given in Equation (8).

$$S(O_{l1}, O_{l2}) = L\left(\frac{d(O_{l1}, O_{l2})}{d_c}\right) \quad (8)$$

As may be observed, a similarity metric $S(O_1, O_2)$ may be determined for different object types (e.g., lane markers, signs, etc.). For example, the similarity metric determiner 116 may determine a first similarity metric for signs and a second similarity metric for lane markers. The similarity metrics for different object types may employ different observations, different distance functions, different kernel functions, and/or different distance parameters, etc.

In some approaches, different similarity metrics (e.g., similarity metrics that utilize different distance functions, different kernel functions, different distance parameters, and/or different observations, etc.) may be determined and/or utilized for different levels of hierarchical clustering. For example, one level of sign clustering may utilize sign center points to determine a similarity metric, while another level of sign clustering may utilize sign corner points.

In some configurations, similarity metrics may be determined for pairs of observations only within an association tile and/or only within a cluster. An association tile may be an area (e.g., geographic area) of a map region within which similarity metrics may be determined and/or within which clustering may be performed. For example, only observations within one association tile may be compared. In some configurations, overlapping association tiles may be utilized.

In some configurations, a range of object data (e.g., range of all triangulation outputs) may be denoted [minE, maxE] (e.g., minimum east to maximum east) and [minN, maxN] (e.g., minimum north to maximum north). The range of object data may cover all journeys and/or may be the maximum extent of a map. In some approaches, pose translation may be utilized for signs. For lane markers (e.g., lane stripes), a minimum and/or maximum along the spline may be utilized.

The map (e.g., map region) may be covered with association tiles. Association tiles may be square, rectangular, circular, and/or irregularly shaped. For example, a tile size may be denoted as assocTileSize×assocTileSize for each tile. Tiles may be overlapping with strideE and strideN steps in east and north, respectively. In some configurations, a flag may be maintained for each tile. For example, a dataPresentFlag may be maintained for each association tile. Only tiles with data may be processed. Other approaches to tiling may be utilized in accordance with the systems and methods disclosed herein. Association tiles and association tile occupancy may be updated incrementally as more data is obtained.

In some configurations, the similarity metric determiner 116 may form a similarity matrix (e.g., full similarity matrix). For example, Sim may denote a similarity matrix between all object data (e.g., all object data for a particular landmark type), such as triangulation outputs. The similarity matrix may be symmetric, with entries in a range of $[0, 1]$. In some approaches, the similarity matrix (e.g., Sim) may be initialized to an identity matrix or other initial value.

An example of pseudocode for forming a similarity matrix for each association tile is provided in Listing (1).
For each tile in assocTiles:
If tile.dataPresentFlag:
Evaluate Sim(.,.) for all pairs of observations in tile (if the observations have not been compared yet, for example);
A sign belongs to a tile if (E, N) of pose translation are in the tile;
A lane marker belongs to a tile if some point on the lane marker (e.g., stripe) has (E, N) within the tile;
Update both $Sim(O_1, O_2)$ and $Sim(O_2, O_1)$ to ensure Sim is symmetric.

Listing (1)

The processor 112 may include and/or implement an object clusterer 118. The object clusterer 118 may cluster objects from the object data (e.g., multi-journey data 128) based on the one or more similarity metrics to produce one or more object clusters. For example, the object clusterer 118 may group objects (e.g., object data corresponding to the same or difference physical objects) into one or more clusters. A cluster may include object data (e.g., a group of observations corresponding to one or more physical objects). For example, a cluster may include a first observation (e.g., object location data, object pose, etc.) from a first journey and a second observation (e.g., object location data, object pose, etc.) from a second journey. In some configurations and/or cases, a single cluster may correspond to one or multiple physical objects. The object clusterer 118 may produce one or more clusters. In some configurations, the one or more clusters may be provided to the mapper 120. It should be noted that the object clusterer 118 may perform unsupervised clustering in some configurations. In some cases, a cluster (e.g., singleton cluster) with only one object observation may result from clustering.

In some configurations, the object clusterer 118 may perform clustering that is limited to objects located within each association tile. This may help to reduce processing burden for large areas.

In some configurations, the object clusterer 118 may determine (e.g., estimate) a number of objects (e.g., actual objects, physical objects, ground truth objects, etc.). As described above, Sim may denote a similarity matrix (e.g., a similarity matrix between all objects). In some approaches, the number of objects may be determined in accordance with the following. A matrix D may be a diagonal matrix, where the diagonal values are the sums of corresponding rows from the similarity matrix. (e.g., D=diag(rowsum(Sim))). The object clusterer 118 may determine eigenvectors and eigenvalues for a matrix W that is based on Sim and D. For example, [eigenVectors, eigenValues]=eig(W), where $W=D^{-1/2}$ Sim $D^{-1/2}$. This may provide a symmetric formulation. In some configurations, eigenvalues(W)=eigenvalues (random walk transition matrix $D^{-1}$ Sim) and eigenvectors (W)=$D^{1/2}$ eigenvectors($D^{-1}$ Sim).

In some approaches, a number of clusters $K_C$ (e.g., a number of objects) may be a number of eigenvalues (of matrix W, for example) that are greater than an eigenvalue threshold. For example, $K_C$ may be determined in accordance with the following formula: $K_C$=number of eigenvalues>eigenValueThreshold. In some configurations, the eigenValueThreshold may be a default value (e.g., 0.75) or some other value. For perfect clusters, for example, the multiplicity of eigenvalue 1 would equal the number of clusters.

An alternative formulation for determining the number of clusters is given as follows: L=I−W. In this approach, a number of clusters $K_C$ (e.g., a number of objects) may be a number of eigenvalues (of matrix L, for example) that are less than an eigenvalue threshold. For example, $K_C$ may be determined in accordance with the following formula: $K_C$=number of eigenvalues<eigenValueThreshold. In some configurations, the eigenValueThreshold may be a default value (e.g., 0.3) or some other value.

In some configurations, clustering may include performing multi-journey association. For example, the object clusterer 118 may associate objects (e.g., object data) from multiple journeys. In some approaches, U may denote an N×$K_C$ matrix corresponding to the eigenvectors of the $K_C$ dominant eigenvalues. The multi-journey association may be clusters from row clustering of U. Row clustering may be accomplished with k-means clustering (e.g., a k-means function) with a Euclidean metric in some implementations. In other implementations, an alternative approach may be utilized. The alternative approach may include taking the sign of columns 2 to $K_C$. Column 1 may be non-negative and may not impact the outcome. A binary code of each row may give the cluster index. It should be noted that the number of clusters may not necessarily be $K_C$. $K_C$ may be adjusted in some approaches to improve performance. In a counter-example, consider the matrix in Equation (9).

$$D^{-1}Sim = \begin{bmatrix} 0.9 & 0.1 & 0 & 0 \\ 0.2 & 0.4 & 0.4 & 0 \\ 0 & 0.4 & 0.4 & 0.2 \\ 0 & 0 & 0.1 & 0.9 \end{bmatrix} \quad (9)$$

This matrix may lead to clusters of rows {1, 2} & {3, 4} instead of {1}, {2, 3}, {4}.

In utilizing a clustering approach, nearby objects (e.g., nearby triangulated objects, nearby physical objects, etc.) of a single journey may be confused and hence merged to a single object. For example, assume two nearby signs observed in two journeys $J_1$ and $J_2$, denoted by $O_{s1}(J_1)$ and $O_{s2}(J_2)$. Setting the $S(O_{s1}(J_1), O_{s2}(J_i))$=0 may not be sufficient to split observations corresponding to $O_{s1}$ and $O_{s2}$ into different clusters. Without a proper choice of the distance parameter (e.g., critical distance, $d_c$, etc.), these 4 sign objects may be merged. This may be a limitation of some clustering approaches.

In order to alleviate this problem, one or more enhancements may be made to one or more of the clustering algorithms. For example, the object clusterer 118 may perform hierarchical clustering and/or constrained spectral clustering.

More detail regarding hierarchical clustering is given as follows. Hierarchical clustering includes multiple levels and/or steps of clustering (e.g., different levels and/or steps of clustering). For example, hierarchical clustering may include multi-stage (e.g., two-stage, three-stage, etc.) clustering. Hierarchical clustering may have one or more differences between clustering levels and/or steps. For example, one or more parameters (e.g., distance parameter) may be different between two or more levels, similarity metrics (e.g., similarity metrics that utilize different distance functions, different kernel functions, different distance parameters, and/or different observations, etc.) may be different between two or more levels, and/or initial clusters may be different between two or more levels. It should be noted that the number of clusters may expand or contract (or may be equal, in some cases) at each level. For example, "top-down" and/or "bottom-up" clustering may be performed. In some approaches, signs may be split into increasing numbers of clusters over a number of clustering levels. In some approaches, lane markers may be consolidated into decreasing numbers of clusters over a number of clustering levels. In some configurations, some or all of the clustering performed at a previous level may be undone for a next level.

In some configurations, the object clusterer 118 may perform hierarchical clustering where a distance parameter may be different for two or more levels and/or steps of clustering. For example, a first step (e.g., level) of clustering may include clustering all signs that are close to each other (e.g., multiple signs on the same pole). A second step (e.g., level) of clustering may then include clustering individual signs on poles. For example, a cluster may include two signs attached to the same pole. Further clustering may be performed to produce clusters, where each cluster represents only a single physical object. For instance, clustering may be performed based on a cluster of two signs to produce two clusters, where each of the clusters corresponds to only one of the signs.

Without a proper choice of the distance parameter (e.g., critical distance, $d_c$, etc.), cluster separation of both nearby and far-away landmarks (e.g., signs) may be different. In one example, hierarchical clustering may include performing two levels of clustering. In a first level of clustering (e.g., level 1), landmarks (e.g., signs) may be clustered with a high value of the distance parameter to discern signs that are relatively far part. For instance, a default distance parameter may be 4 m (e.g., $d_c$=4 m and eigenvalueThreshold=0.3). This may cluster signs from different intersections, for example. In a second level of clustering (e.g., level 2), landmarks (e.g., signs) may be clustered with a lower value of the distance parameter for the similarity metric to discern signs that are nearby each other. For instance, a default distance parameter may be 1 m (e.g., $d_c$=1 m and eigenvalueThreshold=0.3). This may cluster different signs in a given intersection, for example.

In addition to or alternatively from hierarchical clustering, the object clusterer 118 may perform constrained spectral clustering in some configurations. Spectral clustering may be a kind of unsupervised clustering. Beliefs that certain observations may belong to different clusters (e.g., nearby signs from the same trajectory) may be encoded using a constraint matrix. An example of a constraint matrix Q is given in Equation (10).

$$Q = \begin{bmatrix} -1 & -1 & -1 & & & & \\ -1 & -1 & -1 & \cdots & & 0 & \\ -1 & -1 & -1 & & & & \\ \vdots & & \ddots & & & \vdots & \\ & & & -1 & -1 & -1 \\ & 0 & \cdots & -1 & -1 & -1 \\ & & & -1 & -1 & -1 \end{bmatrix} \quad (10)$$

In Equation (10), $Q \in [0, -1]^{(n \times n)}$, where n is a number of observations. When it is believed that objects $O_i$ and $O_j$ belong to different clusters, $Q(O_i, O_j)=-1$ may be enforced.

In some configurations, the object clusterer 118 may perform constrained spectral clustering in accordance with the following approach. For example, this approach may provide an algorithm for constrained spectral clustering for $K_C$-way partitioning. Sim is a similarity matrix (which may additionally or alternatively be referred to as an affinity matrix, for example). β is a threshold on the number of constraints that need to be satisfied. $K_C$ is a number of clusters. In some implementations, $K_C$ may be determined from a spectral gap of Equation (11).

$$\bar{L}v = \lambda\left(\bar{Q} - \frac{\beta}{vol}I\right)v \quad (11)$$

In Equation (11), $\bar{L}$ is the symmetric version of the Laplacian L of the graph (called the constraint graph, for example) corresponding to the elements to be clustered, v is the non-trivial eigen vector of $\bar{L}$, λ is the corresponding eigen value and vol is the sum of the degrees of all nodes of the constraint graph. Listing (2) provides an example of an algorithm for constrained spectral clustering. The algorithm may take a similarity matrix Sim, a constraint matrix Q, β, and $K_C$ as inputs. The algorithm may output a cluster assignment indicator u*.

$$vol \leftarrow \sum_{i=1}^{N}\sum_{j=1}^{N} Sim_{i,j}, D \leftarrow \text{diag}\left(\sum_{j=1}^{N} Sim_{i,j}\right);$$

$$\bar{L} \leftarrow I - D^{-\frac{1}{2}}SimD^{-\frac{1}{2}}, \bar{Q} \leftarrow D^{-\frac{1}{2}}QD^{-\frac{1}{2}};$$

$\lambda_{max}$←largest eigenvalue of Q;
if $\beta \geq \lambda_{K-1}$ vol, then
return u*=0;
end
else
Solve Equation (11) (e.g., generalized eigenvalue system);
Remove eigenvectors corresponding to non-positive eigenvalues and normalize the remainder by $$v \leftarrow \frac{v}{\|v\|}\sqrt{vol};$$

V*←arg min$_{V \in R^{N \times (K-1)}}$ trace (V$^T\bar{L}$V), where V columns are a subset of the feasible eigenvectors generated in the previous step;
return $$u^* \leftarrow kmeans\left(D^{-\frac{1}{2}}V^*K_c\right);$$

end

Listing (2)

The processor 112 may include and/or implement a mapper 120. The mapper 120 may produce map data based on the one or more object clusters. For example, the mapper 120 may produce and/or update a three-dimensional (3D) map of an area that is populated by one or more objects corresponding to the one or more object clusters. For instance, each object cluster may represent a single object (e.g., multiple measurement instances of a single object for multiple journeys). In some configurations, the mapper 120 may produce a map with signs (e.g., 6 DOF poses) and lanes (e.g., 3D splines). In some configurations, the processor 112 (e.g., similarity metric determiner 116, object clusterer 118, and/or mapper 120) may perform an incremental map update. For example, the processor 112 (e.g., mapper 120) may add a new object to a map in a case that a confidence threshold is met for an object. Additionally or alternatively, the processor 112 (e.g., mapper 120) may remove an object from a map in a case that the object is not indicated in the object data with a confidence threshold.

Additional detail regarding multi-journey mapping that may be performed by the apparatus 102 in some configurations of the systems and methods disclosed herein is given as follows. For example, one or more of the following operations, functions, approaches, etc., may be performed by the processor 112 (e.g., the multi-journey data obtainer 114, the similarity metric determiner 116, the object clusterer 118, and/or the mapper 120).

The apparatus 102 may perform 3D reconstruction of sign and lane landmarks using information that is aggregated from multiple journeys. For example, the apparatus 102 (e.g., processor 112) may utilize inter-journey association schemes for signs and lane markers and may utilize an algorithm for 3D reconstruction of these landmarks.

In some configurations, landmarks may be represented as follows. A sign $Sign_i$ may be represented as an ordered sequence of 3D sign corners, $\{Sign_{ij}, 1 \leq j \leq C_{sign}\}$, where $C_{sign}$ is a number of sign corners of the sign face. Lane markers may be represented as cubic splines with multiple (e.g., 2, 3, 4, 5, etc.) control points. A lane marker $L_i$ may be given by a sequence of control points $\{L_{ij}, 1 \leq j \leq C_L\}$, where $C_L$ is the number of controls points. The apparatus 102 (e.g., processor 112) may perform association across multiple journeys for signs and lane markers independently. Examples of algorithms for signs and lane markers (e.g., multi-journey landmark clustering) are given as follows.

Triangulated landmarks from individual journeys and their associated positioning and geometric observations may be stored (e.g., in the apparatus 102, in the memory 126, in a vehicle, and/or in a backend mapping server, etc.). The aim of multi-journey sign and/or lane marker clustering may be to identify the group of triangulation outputs for several individual journeys (from different vehicles, across different times, etc.) that correspond to the same true underlying landmark object (e.g., physical object). Clustering may be utilized to address this problem.

In some configurations, spectral clustering may be utilized, since spectral clustering may be able to estimate the number of clusters (e.g., the number of true landmarks) underlying the triangulation outputs from multiple journeys. Given any two landmarks, a similarity metric may be defined between the landmarks. In some approaches, the similarity metric may take values in the range of [0, 1], with a value of 1 indicating a perfect match, while 0 may imply different objects. Spectral clustering may rely on the eigenvalues and eigenvectors of the similarity matrix (or associated probability transition matrix or Laplacian, for example) to form the clusters.

In a noiseless scenario, if there are exactly P distinct landmarks, then the similarity matrix may be expressed as a block diagonal matrix, where each of the P diagonal blocks is the all ones matrix. For example, the matrix may have an eigenvalue 1 repeated P times and all other eigenvalues are zero. In a real-world scenario, in spite of non-idealities, a spectral gap may be apparent, which may allow estimating the number of clusters. Once the number of clusters is identified, a k-means clustering of the rows of the Laplacian eigenvector matrix may yield the final clusters. As follows, specific similarity metrics used for traffic signs and lane markers are described.

In some configurations, sign clustering across multiple journeys may be performed. In some approaches, visual features (e.g., image patches) may not be available and/or may not be utilized to perform data association across the different triangulated signs from multiple journeys. For example, geometric information (e.g., 3D geometric information) (and not visual information, for example) about the triangulated signs may be utilized in some approaches. Utilizing geometric information may provide sufficient accuracy for some highway and suburban roads. In other approaches, visual features may be utilized for sign clustering.

In the multi-journey setting, superscript (k) notation may be utilized to denote the k-th journey associated with a landmark. To perform data association via spectral clustering (in some configurations and/or at one or more hierarchical levels), the center of the sign face of $Sign_i^{(k)}$ may be used, which may be denoted $\overline{Sign_i^{(k)}}$. In some approaches, the sign center may be less sensitive to triangulation noise for the clustering process. The distance between two sign triangulations, $Sign_i^{(k)}$ and $Sign_{i'}^{(k')}$, may be the L2 distance between the sign centers:

$$d(Sign_i^{(k)}, Sign_{i'}^{(k')}) = \left\| \overline{Sign_i^{(k)}} - \overline{Sign_{i'}^{(k')}} \right\|.$$

To map the distance metric to a similarity value in [0; 1], a Gaussian kernel may be utilized in some approaches to modulate the distance metrics as illustrated in Equation (12).

$$Sim(Sign_i^{(k)}, Sign_{i'}^{(k')}) = \exp\left(-\frac{1}{2}\left(\frac{d(Sign_i^{(k)}, Sign_{i'}^{(k')})}{d_c}\right)^2\right) \quad (12)$$

In Equation (12), $d_c$ is a tunable distance parameter (e.g., critical distance parameter) that implicitly controls the clustering radius. For example, a larger $d_c$ will cluster sign triangulations in a larger geographical area, and a smaller $d_c$ will cluster sign triangulations in a smaller geographical area. A prior that triangulations from a single journey are distinct may be encoded by initializing $Sim(Sign_i^{(k)}, Sign_{i'}^{(k')})=0$. It should be noted that this may be a soft constraint and may not enforce that signs from the same journey are not clustered.

Once the similarity matrix is computed, spectral clustering may be performed to cluster the sign triangulations to different clusters. For example, setting $d_c=4$ m may enable clustering signs from different sign posts, but the clustering algorithm may have difficulty in separating signs in a given signpost. Using a smaller distance parameter (e.g., $d_c=1$ m) initially may create many clusters yielding several duplicate signs even after clustering. To address this issue, hierarchical clustering may be performed. For example, the apparatus 102 (e.g., processor 112, object clusterer 118, etc.) may perform two-stage hierarchical clustering in a top-down fashion. For instance, the first stage of clustering may be performed with $d_c=4$ m. In a second stage of clustering, each of the signs of the clusters from the first stage may be clustered further using $d_c=1$ m. This approach may provide improved clustering and data association.

In a multi-journey framework (e.g., multi-journey crowd-sourced framework), some single-journey reconstructed objects $Sign_i^{(k)}$ may have high errors, which may form outlier points for a clustering approach. To filter outliers, all clusters may be discarded that have less than a threshold number of signs. In a conservative example, only sign clusters that have only one sign object (e.g., singleton clusters) may be discarded. The data loss of this scheme may be quantified.

In some approaches, for each cluster, the cluster-head sign $Sign_i$ Si obtained by averaging over respective sign-corners of all signs in a given cluster may be defined. Thereafter, $Sign_i$ may be used as the representative sign to uniquely describe the sign. The sign corners of $Sign_i$ may be used in the initialization step of a bundle adjustment procedure.

The apparatus 102 may perform lane marker clustering across multiple journeys. In some approaches, lane markers $Lane_i$ may be defined by spline control-points $Lane_{i,j}$, and may be obtained from each journey. Lane marker information obtained from different journeys may be aggregated. In some configurations, $Lane_i^{(k)}$ may denote a triangulated lane marker from journey k.

Given triangulated lane markers from multiple journeys (which may be parametrized by splines, for example), the apparatus 102 (e.g., processor 112) may determine which lane markers come from the same real-world lane marker (e.g., physical lane marker). To determine which lane markers correspond to the same real-world lane marker, the apparatus 102 (e.g., similarity metric determiner 116) may determine a similarity metric for a pair of splines and create a similarity matrix by computing the similarity metric for every pair of splines (e.g., every pair of splines within an association tile, for example). Spectral clustering may be performed on the similarity matrix. In some configurations, the apparatus 102 may utilize the similarity metric and hierarchical clustering for lane markers.

An example of a similarity metric for lane markers is given as follows. In the triangulation output, splines may be defined by an adaptive number of control points depending on length. To compute the similarity metric the apparatus 102 (e.g., processor 112, similarity metric determiner 116, etc.) may sample each spline more finely. For example, each spline may be sampled to have a particular density of samples (e.g., having as many sample points as the approximate spline length in meters). For two splines $Lane_i$ and $Lane_j$, with sample points given by the sets $A=\{a_i\}$ and $B=\{b_j\}$, the apparatus 102 (e.g., similarity metric determiner 116) may find the $L^2$ distance between each pair of sample points $a_i$ and $b_j$: $d(a_i, b_j)$. The metric $D_{min} \triangleq \min d(a_i, b_j)$ may indicate how close the splines get to each other. With a threshold r, Equation (13) may be computed.

$$N \triangleq \frac{|\{(a_i, b_j) : d(a_i, b_j) < r\}|}{(|A||B|)} \quad (13)$$

In Equation (13), N is a number (e.g., normalized number) of sample point pairs for which the two splines are within a distance r of each other. This may indicate a portion for which the splines run alongside each other. Each of these metrics may be useful independently. In some configurations, a similarity metric that combines two metrics may be computed as $$Sim(Lane_i, Lane_j) = \frac{N}{D_{min}}.$$

In some approaches, a Gaussian kernel may also be used as illustrated in Equation (14).

$$Sim(Lane_i, Lane_j) = \exp\left(-\frac{1}{2}\left\{\frac{D_{min}}{dN}\right\}^2\right) \quad (14)$$

In Equation (14), d may be a tunable parameter.

The apparatus 102 (e.g., processor 112, object clusterer 118) may perform hierarchical clustering in some configurations. Once a similarity matrix is computed, the apparatus (e.g., object clusterer 118) may compute the eigenvalues of the similarity matrix, may determine a number of clusters, and/or may obtain the clusters by binning the eigenvectors. Cluster hierarchically may be beneficial. For example, instead of creating a number of clusters in a single step, hierarchical clustering may include multiple stages (e.g., levels, steps, etc.). In some configurations, hierarchical clustering may include performing a subsequent round of clustering on the output clusters of a previous round of clustering. For example, two, three, or more stages of clustering may be performed. Hierarchical clustering may provide better error performance than performing only one round of clustering. In some approaches, hierarchical clustering may reduce the number of clusters for each stage of clustering.

Clustering may determine which triangulated lane marker objects to aggregate together. By creating a point cloud from the control points of these triangulated lane markers, and fitting a spline to the point cloud, lane marker objects $Lane_i$ may be obtained. The lane marker objects $Lane_i$ may be used in landmark reconstruction. $Lane_i$ may serve as the cluster-head lane marker object of the all lane marker objects of the given cluster.

In some configurations, the apparatus 102 may perform landmark reconstruction. Landmarks (e.g., sign and lane marker landmarks) may be reconstructed using a procedure called bundle adjustment (BA) that refines both the 3D location of landmarks and camera poses. In some configurations, the processor 112 (e.g., similarity metric determiner 116, object clusterer 118, and/or mapper 120) may perform bundle adjustment.

In some approaches, triangulation may include fixing camera 6 DOF pose and estimating object location information (e.g., sign 6 DOF pose, size, lane marker splines, etc.). Bundle adjustment may include jointly estimating both camera and object pose (e.g., sign 6 DOF pose and/or size, etc.). Triangulation and bundle adjustment may be utilized to avoid bad local minima of a re-projection error. The map produced may provide 6 DOF sign pose, size, sign type, content, etc.

More detail on bundle adjustment (e.g., BA) and a cost function is given as follows. In particular, some configurations of the systems and methods disclosed herein with a multi-journey setup may be implemented in accordance with one or more aspects of the following. Initialization may utilize a "mean" of landmark (e.g., sign) poses in a cluster for a baseline map. A non-linear bundle adjustment may include two constraints: re-projection error and reference cost. The re-projection error may be the error between projection of the estimated 3D objects (e.g., signs corners and lane markers) to the image plane observed detections (from perception and/or object detection, for example). A common bias variable (6 DOF) may be added to the camera pose variable per journey. There may be one such variable for every journey. The reference cost may be the error between the camera pose variable and the camera pose observation from an ego-positioning system.

The BA primitive may be a non-linear optimization that jointly refines (e.g., optimizes) the camera poses $p_n$ and the landmark locations. BA may use a camera re-projection error as an error metric for the refinement (e.g., optimization). Each sign $Sign_i$ may have an associated set of image observations. For all frames $f_n$ with poses $p_n$ that have observations of sign $Sign_i$, denoted by $s_{n,i}$, the sign re-projection cost may be defined as $\Sigma_n \|\Pi_{p_n}(Sign_i) - s_{n,i}\|^2$, where $\Pi_{p_n}$ is the projection of the sign corners to the image coordinates for pose $p_n$. The error may be computed as the L2 distance between the sign corners in the image coordinates. Each lane marker $Lane_i$ may also have an associated set of image observations. For all frames $f_n$ with poses $p_n$ that contain observations of lane marker $Lane_i$, the lane marker re-projection cost may be defined as $\Sigma_n \|\Pi_{p_n}(Lane'_i) - l_{n,i}\|^2$, where $Lane'_i$ is the spline point that comes closest to observation $l_{n,i}$ when projected, and $\Pi_{p_n}$ is the projection to the image coordinates of that spline point, for pose $p_n$. The error may be computed as the L2 distance between the sign corners in the image coordinates. The BA optimization may perform refinement (e.g., optimization) in accordance with Equation (15).

$$\underset{\{p_n, Sign_i, Lane_i\}}{\arg\min} \left( \sum_n \left\| \prod_{p_n}(Sign_i) - s_{n,i} \right\|^2 + \sum_n \left\| \prod_{p_n}(Lane'_i) - l_{n,i} \right\|^2 \right) \quad (15)$$

Solving Equation (15) may produce the refined camera poses, sign corners, and lane marker parameters (spline parameters). The problem may be a highly non-convex problem. In some configurations, an iterative Levenberg-Marquardt algorithm may be used to find a local minimum. The fidelity of the reconstruction may be sensitive to the initialization of the camera pose and landmark parameters. To initialize the landmark parameter value(s) of $Sign_i$ and $Lane_i$, the cluster heads from clustering may be used. To initialize the camera pose parameter $p_n$ value(s), information from multiple journeys may be aggregated to compensate for observed bias in the single-journey camera poses. The bias may be inferred by averaging the camera poses and landmark reconstructions across the multiple journeys. Bias-compensated camera poses may be used to initialize the $p_n$ value(s). To make the above optimization problem less sensitive to outlier observations, a Tukey weighing function may be applied to the above cost function to robustify the optimization primitives.

It should be noted that one or more of the elements or components of the electronic device may be combined and/or divided. For example, the multi-journey data obtainer 114, the similarity metric determiner 116, the object clusterer 118, and/or the mapper 120 may be combined. Additionally or alternatively, the multi-journey data obtainer 114, the similarity metric determiner 116, the object clusterer 118, and/or the mapper 120 may be divided into elements or components that perform a subset of the operations thereof.

It should be noted that one or more of the elements or components described in connection with the processor 112 may be optional. For example, the apparatus 102 may or may not include and/or may or may not implement the multi-journey data obtainer 114, the similarity metric determiner 116, the object clusterer 118, and/or the mapper 120 in some configurations. In some implementations, the multi-journey data obtainer 114, the similarity metric determiner 116, the object clusterer 118, and/or the mapper 120 may be implemented as independent circuitry (not as part of a processor 112, for example). In some configurations, a group of apparatuses (e.g., a drone swarm, group of vehicles, etc.) may coordinate. For example, a set of apparatuses 102 may provide (e.g., send, transmit, etc.) journey data to another apparatus (e.g., server, vehicle, etc.) that may map one or more objects.

Figure 2:
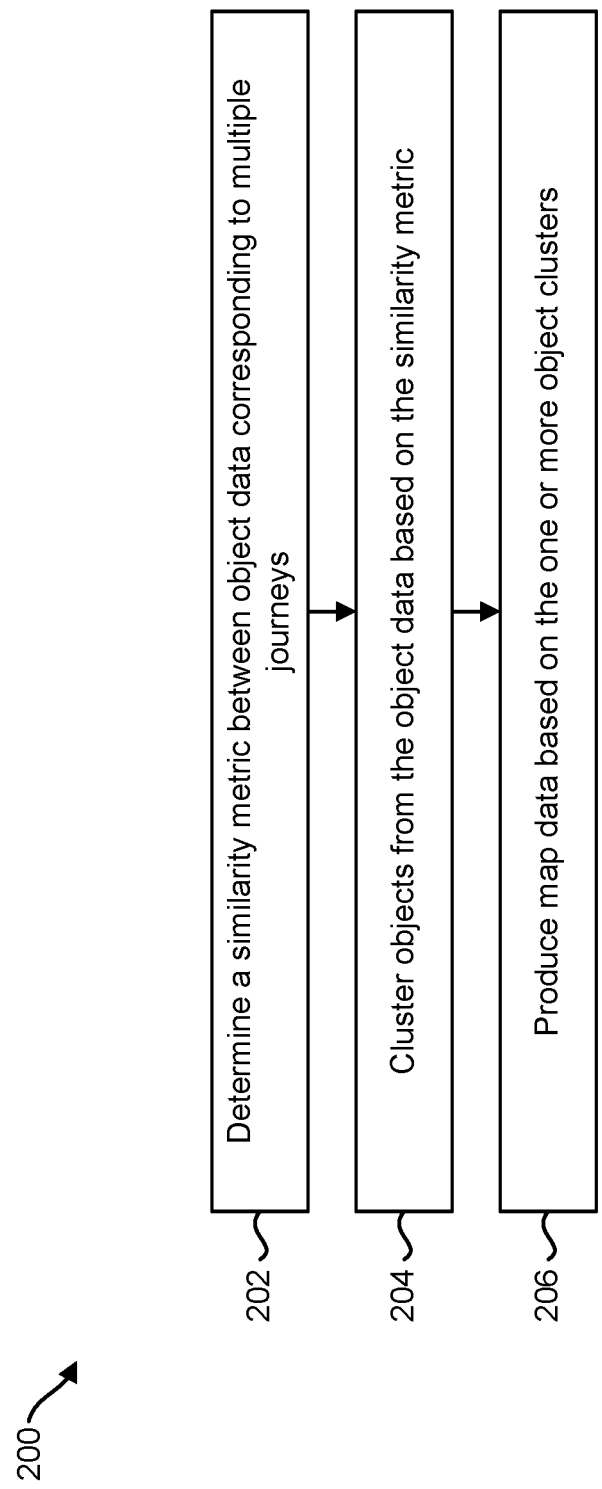
FIG. 2 is a flow diagram illustrating one configuration of a method for mapping based on multi-journey data.

FIG. 2 is a flow diagram illustrating one configuration of a method 200 for mapping based on multi-journey data. The method 200 may be performed by the apparatus 102 described in connection with FIG. 1. The apparatus 102 may determine 202 a similarity metric between object data corresponding to multiple journeys. This may be accomplished as described in connection with FIG. 1. For example, the apparatus 102 may determine a similarity metric that indicates a distance between objects (e.g., object corners, object centers, nearest points, etc.) from object data of multiple journeys.

The apparatus 102 may cluster 204 objects from the object data based on the similarity metric to produce one or more object clusters. This may be accomplished as described in connection with FIG. 1. For example, the apparatus 102 may group objects between multiple journeys. It should be noted that the "objects" from multiple journeys may correspond to the same or different physical objects in some cases. In some configurations, clustering may include hierarchical clustering and/or constrained spectral clustering.

The apparatus 102 may produce 206 map data based on the one or more object clusters. This may be accomplished as described in connection with FIG. 1. For example, the apparatus 102 may produce a map that includes one or more objects corresponding to the one or more object clusters.

Figure 3:
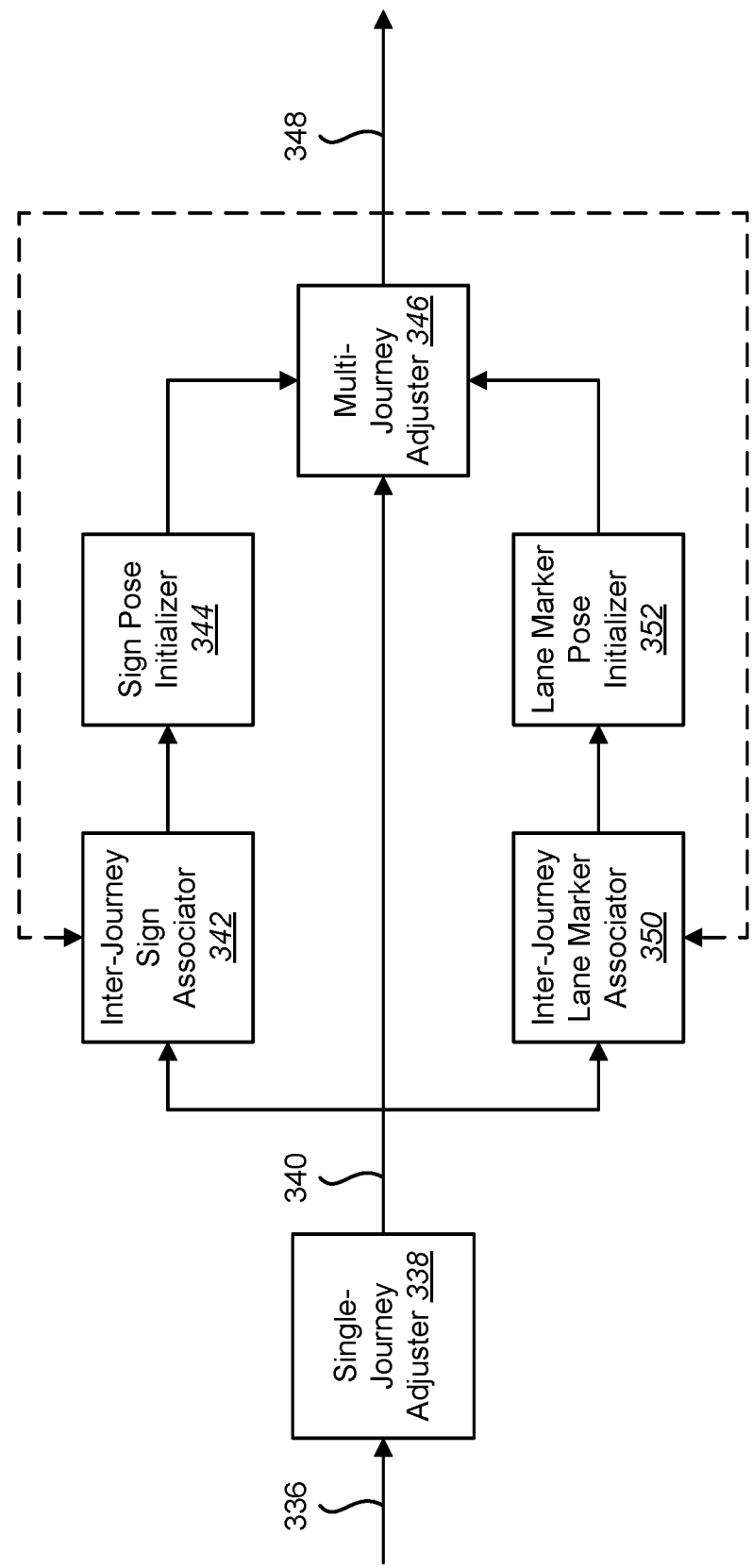
FIG. 3 is a block diagram illustrating an example of one or more components, elements, and/or functions that may be performed in accordance with some configurations of the systems and methods disclosed herein.

FIG. 3 is a block diagram illustrating an example of one or more components, elements, and/or functions that may be performed in accordance with some configurations of the systems and methods disclosed herein. In particular, FIG. 3 illustrates a single-journey adjuster 338, an inter-journey sign associator 342, a sign pose initializer 344, an inter-journey lane marker associator, a lane marker pose initializer 352, and a multi-journey adjuster 346. One or more of the components, elements, and/or functions described in connection with FIG. 3 may be implemented in the apparatus 102 described in connection with FIG. 1 in some configurations.

An apparatus 102 may obtain (e.g., receive) journey data 336 (e.g., single-journey and/or multi-journey data). For example, the data 336 may include raw data (e.g., images, detection outputs, etc.) and/or triangulation outputs from one or more vehicles from one or more journeys. In some configurations, the journey data 336 may be provided to the single-journey adjuster 338. The single-journey adjuster 338 may perform single-journey bundle adjustment. For example, the single-journey adjuster 338 may refine camera poses and landmark locations within a single-journey (e.g., within each of one or more single journeys). Bundle adjustment may be performed as described in connection with FIG. 1 in some configurations. It should be noted that single-journey bundle adjustment may be optional (e.g., may or may not be implemented and/or performed in some configurations and/or for some data).

Journey data 340 (e.g., raw data, triangulation outputs, object location data, object pose data, single-journey refined data (e.g., bundle adjustment outputs), associations, subsets thereof, etc.) may be provided to the inter-journey sign associator 342, to the inter-journey lane marker associator 350, and/or the multi-journey adjuster 346. The inter-journey sign associator 342 may associate signs (e.g., sign observations, sign data, sign poses, etc.) between journeys. This may be accomplished as described in connection with FIG. 1. For example, the inter-journey sign associator 342 may determine one or more similarity metrics between sign data corresponding to multiple journeys. The inter-journey sign associator 342 may also cluster the sign data (e.g., sign observations, sign poses, etc.) based on the similarity metric(s).

The sign pose initializer 344 may perform sign pose initialization. This may be accomplished as described in connection with FIG. 1. For example, the sign pose initializer 344 may utilize cluster heads from sign clustering. The sign pose initializer output may be provided to the multi-journey adjuster 346.

The inter-journey lane marker associator 350 may associate lane markers (e.g., lane marker observations, lane marker data, splines, etc.) between journeys. This may be accomplished as described in connection with FIG. 1. For example, the inter-journey lane marker associator 350 may determine one or more similarity metrics between lane marker data corresponding to multiple journeys. The inter-journey lane marker associator 350 may also cluster the lane marker data (e.g., lane marker observations, lane marker poses, etc.) based on the similarity metric(s). The output of the inter-journey lane marker associator 350 may be provided to the lane marker pose initializer 352.

The lane marker pose initializer 352 may perform lane marker pose initialization. This may be accomplished as described in connection with FIG. 1. For example, the lane marker pose initializer 352 may utilize cluster heads from lane marker clustering. The lane marker pose initializer 352 output may be provided to the multi-journey adjuster 346.

The multi-journey adjuster 346 may perform multi-journey bundle adjustment based on the sign pose initialization data, the lane marker pose initialization data, and/or the raw data. This may be accomplished as described in connection with FIG. 1. For example, the multi-journey adjuster 346 may refine camera poses and/or landmark (e.g., sign and lane marker) locations. The multi-journey adjuster 346 may produce a map 348. For example, the map 348 may include one or more locations of one or more landmarks (e.g., signs and/or lane markers) in a 3D map. In some configurations, the map 348 may indicate the landmark locations relative to 3D world coordinates. In some configurations, the map 348 and/or feedback (e.g., corrective feedback) may be provided to the inter-journey sign associator 342 and/or to the inter-journey lane marker associator 350.

Figure 4B:
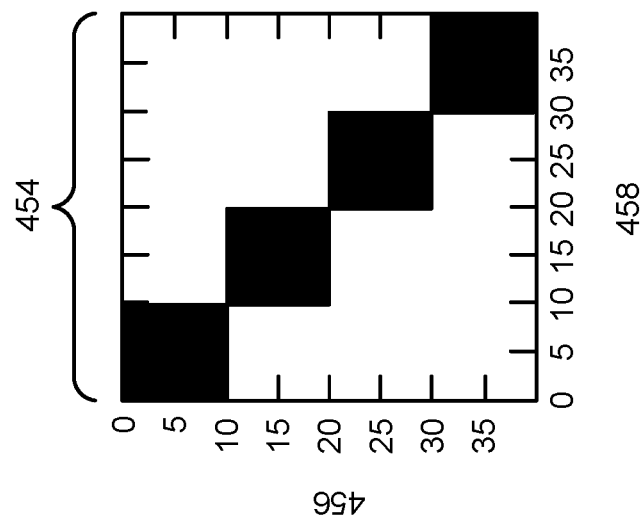
FIG. 4B is a diagram illustrating an example of an approach for multi-journey sign association.
Figure 4A:
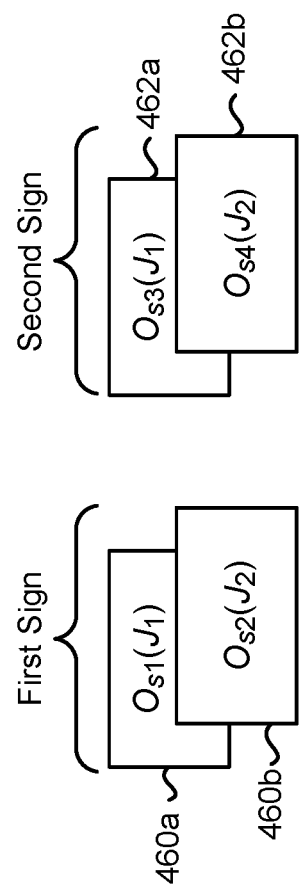
FIG. 4A is a diagram illustrating an example of using spectral clustering to associate triangulated signs across multiple journeys.

FIG. 4A is a diagram illustrating an example of using spectral clustering to associate triangulated signs across multiple journeys. For example, FIG. 4A illustrates observations of two signs, a first sign and a second sign, from two journeys, $J_1$ and $J_2$. In particular, FIG. 4A illustrates a first observation 460a of the first sign from a first journey (e.g., $O_{s1}(J_1)$) and a second observation 460b of the first sign from a second journey (e.g., $O_{s2}(J_2)$). FIG. 4A also illustrates a first observation 462a of the second sign from a first journey (e.g., $O_{s3}(J_1)$) and a second observation 462b of the second sign from a second journey (e.g., $O_{s4}(J_2)$). In this example, an objective of some of the configurations of the systems and methods disclosed herein may be to split the 4 observations $O_{s1}$, $O_{s2}$, $O_{s3}$, and $O_{s4}$ into two clusters. The two clusters may correspond to the two signs (e.g., two actual signs, two physical signs, etc.).

FIG. 4B is a diagram illustrating an example of an approach for multi-journey sign association. For example, the apparatus 102 may perform spectral clustering as described in connection with FIG. 4B in order to cluster the signs described in connection with FIG. 4A. Different shapes may be clustered separately in some approaches. Other binning criteria may be utilized in other approaches. In some configurations, the apparatus 102 may compute a distance matrix of triangulation outputs, normalize entries with $d_c$, and/or map to similarities (taking values in [0, 1], for example). Clusters may be strongly connected components. A number of signs (e.g., "numSigns") may be a number of Laplacian eigenvalues near zero. The apparatus 102 may cluster rows of a corresponding eigenvector matrix using a k-means approach or a sign approach (e.g., sign of columns) as described in connection with FIG. 1.

In particular, FIG. 4B illustrates an example 454 of a similarity matrix. The example 454 is a graph illustrated in rows 456 over columns 458. In the example 454 high values (e.g., 1) are illustrated in black, while low values (e.g., 0) are illustrated in white. Spectral clustering may utilize block diagonal-like structures in a similarity matrix to infer the number of unique signs. Clustering may be performed based on this cue.

In some configurations, the apparatus 102 may perform hierarchical clustering (e.g., multiple-stage clustering, two-stage clustering, etc.). To resolve signs at different magnitudes of separation, for example, two levels of clustering may be performed. At a first level, the apparatus 102 may cluster the signs with a higher value of critical distance (e.g., $d_c=4$ m) to discern signs separated at a relatively large distance (e.g., signs from different intersections). At a second level, the apparatus 102 may cluster signs with a lower value of critical distance (e.g., $d_c=1$ m) for the similarity metric to discern signs that are relatively nearby (e.g., in a given intersection).

FIG. 5 is a diagram illustrating examples of single-journey triangulations 564a-c. In particular, FIG. 5 illustrates examples of camera poses 566 and sign poses 568 for three single-journey triangulations. As described herein, a vehicle may collect single-journey data (e.g., the single-journey triangulations 564a-c). Additionally or alternatively, multiple vehicles may collect single-journey data (e.g., the single-journey triangulations 564a-c). The single-journey triangulations 564a-c may be provided to an apparatus 102 in some approaches.

Figure 6:
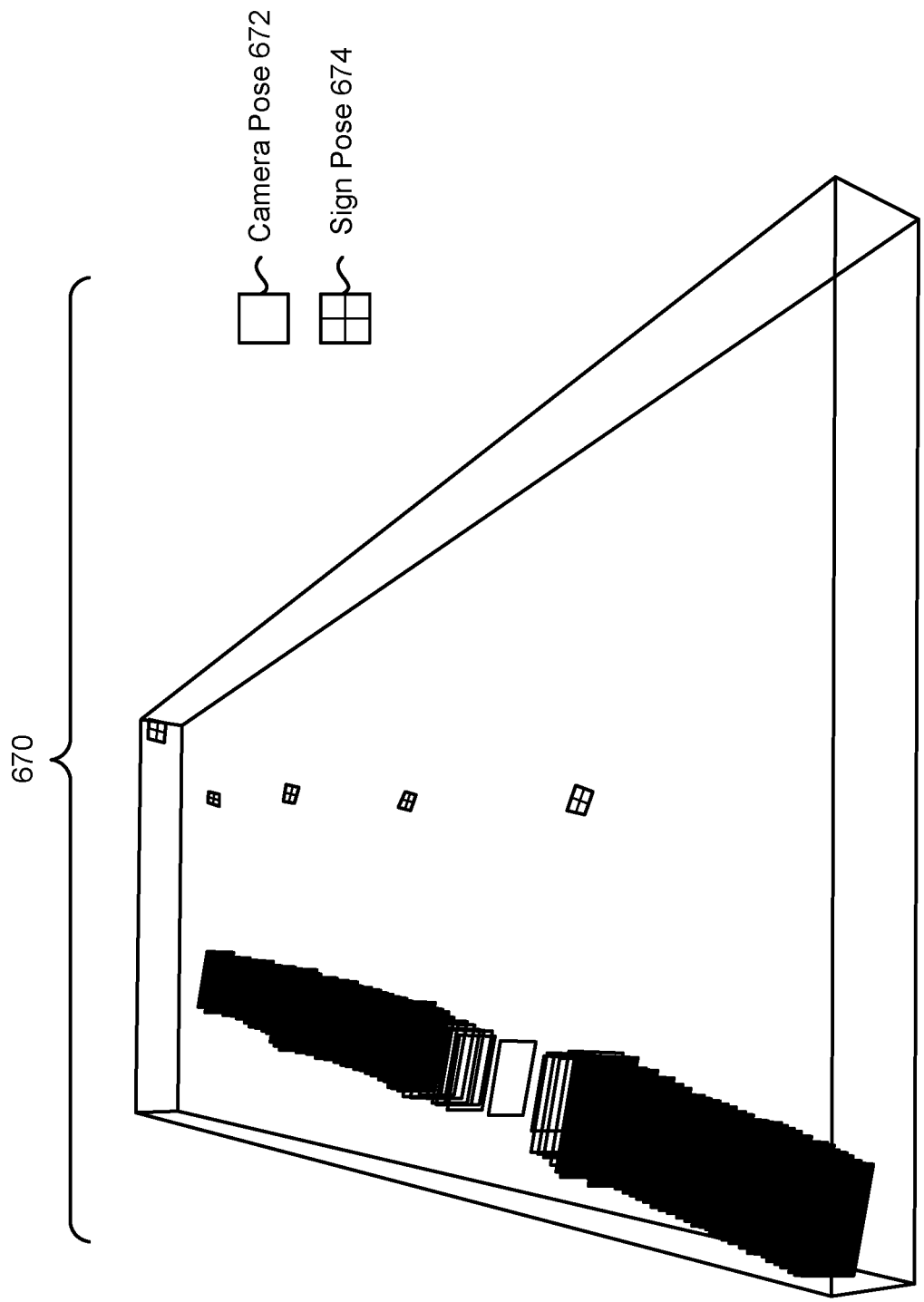
FIG. 6 is a diagram illustrating an example of a reconstruction from multi-journey bundle adjustment.

FIG. 6 is a diagram illustrating an example of a reconstruction 670 (e.g., map) from multi-journey bundle adjustment. In particular, FIG. 6 illustrates examples of camera poses 672 and sign poses 674 that may be reconstructed based on some configurations of the systems and methods disclosed herein (e.g., a multi-journey pipeline). For example, the apparatus 102 described in connection with FIG. 1 may utilize the single-journey triangulations 564a-c from FIG. 5 to produce the reconstruction 670 illustrated in FIG. 6. The reconstruction 670 (e.g., map) may be produced by determining similarity metrics between sign observations and by clustering the sign observations in accordance with some configurations of the systems and methods disclosed herein. Table (1) illustrates an example of reconstruction results with initialization by averaging.

TABLE (1)

| signID | t1 | t2 | t3 | rotX | rotY | rotZ | w | h |
|---|---|---|---|---|---|---|---|---|
| 1 | 29.9 | 1.4 | 2.3 | 91.7 | −6.4 | 106.5 | 0.8 | 0.8 |
| 2 | 40.0 | 1.5 | 2.5 | 95.3 | −11.7 | 110.8 | 1.0 | 0.6 |

TABLE (1)-continued

| signID | t1 | t2 | t3 | rotX | rotY | rotZ | w | h |
|---|---|---|---|---|---|---|---|---|
| 3 | 69.3 | 5.9 | 1.5 | 82.4 | −7.8 | 92.9 | 1.3 | 1.6 |
| 4 | 49.9 | 1.5 | 2.2 | 92.5 | −5.6 | 91.8 | 0.8 | 0.7 |
| 5 | 60.0 | 1.5 | 2.1 | 91.7 | −4.8 | 90.8 | 0.7 | 0.6 |

Table (2) illustrates an example of reconstruction results after bundle adjustment.

TABLE (2)

| signID | t1 | t2 | t3 | rotX | rotY | rotZ | w | h |
|---|---|---|---|---|---|---|---|---|
| 1 | 29.7 | 1.1 | 2.6 | 90.6 | −5.8 | 99.7 | 0.8 | 0.8 |
| 2 | 39.9 | 1.3 | 2.3 | 95.2 | −6.1 | 104.4 | 0.7 | 0.6 |
| 3 | 69.3 | 6.1 | 1.3 | 95.3 | −4.4 | 91.1 | 1.2 | 1.3 |
| 4 | 50.1 | 1.8 | 1.9 | 96.0 | −6.0 | 91.9 | 0.9 | 0.7 |
| 5 | 60.2 | 1.8 | 1.9 | 93.3 | −5.0 | 90.5 | 0.7 | 0.7 |

Figure 7:
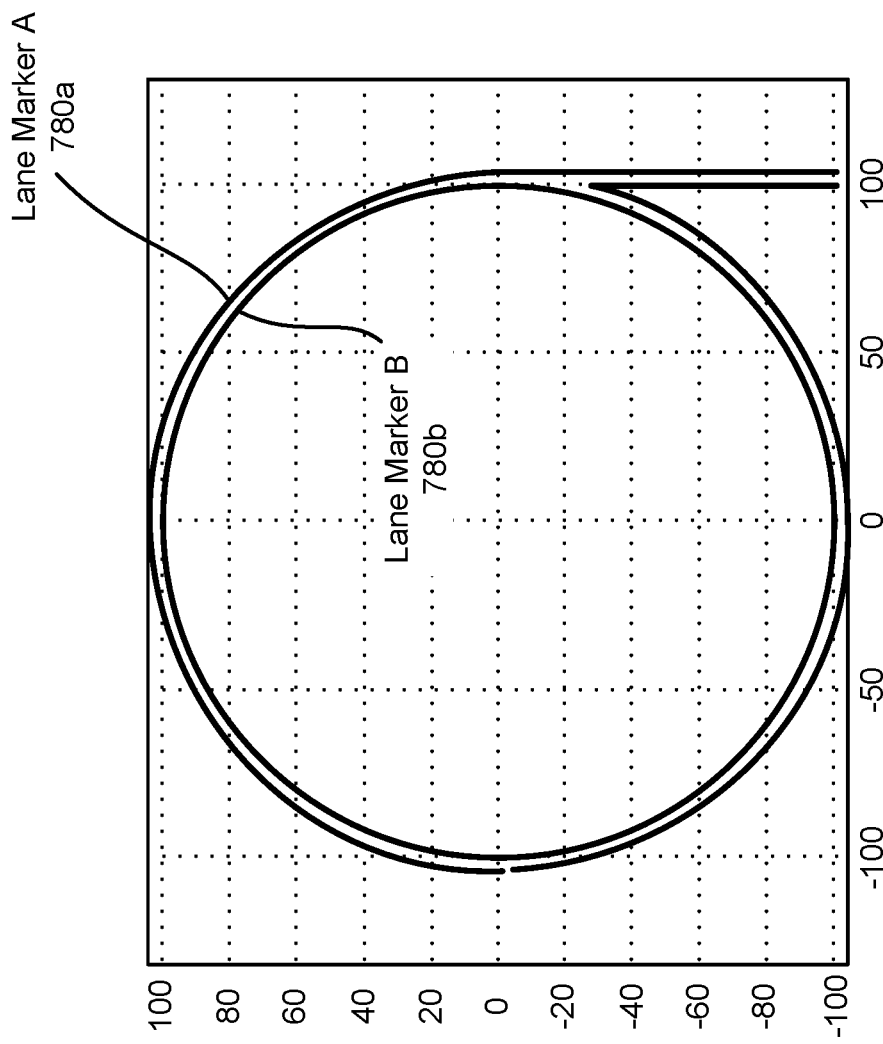
FIG. 7 is a diagram illustrating a lane marker simulation setup.

FIG. 7 is a diagram illustrating a lane marker simulation setup. In particular, FIG. 7 illustrates lane marker A 780*a* and lane marker B 780*b*. The Y (e.g., vertical in FIG. 7) axis 782 is illustrated in meters, and the X (e.g., horizontal in FIG. 7) axis 784 is illustrated in meters. For example, two simulated "lane markers" may be formed with a constant gradient in Z from left to right. In this setup, the lane width=4 m, inner radius=100 m, and stripe length=30 m. 200 stripes per lane marker were utilized. A 1 m sampling along the stripe for computations was utilized. Triangulation noise was also added (e.g., IID Gaussian, zero mean, 1 m std dev noise in X, Y, Z directions).

Figure 8:
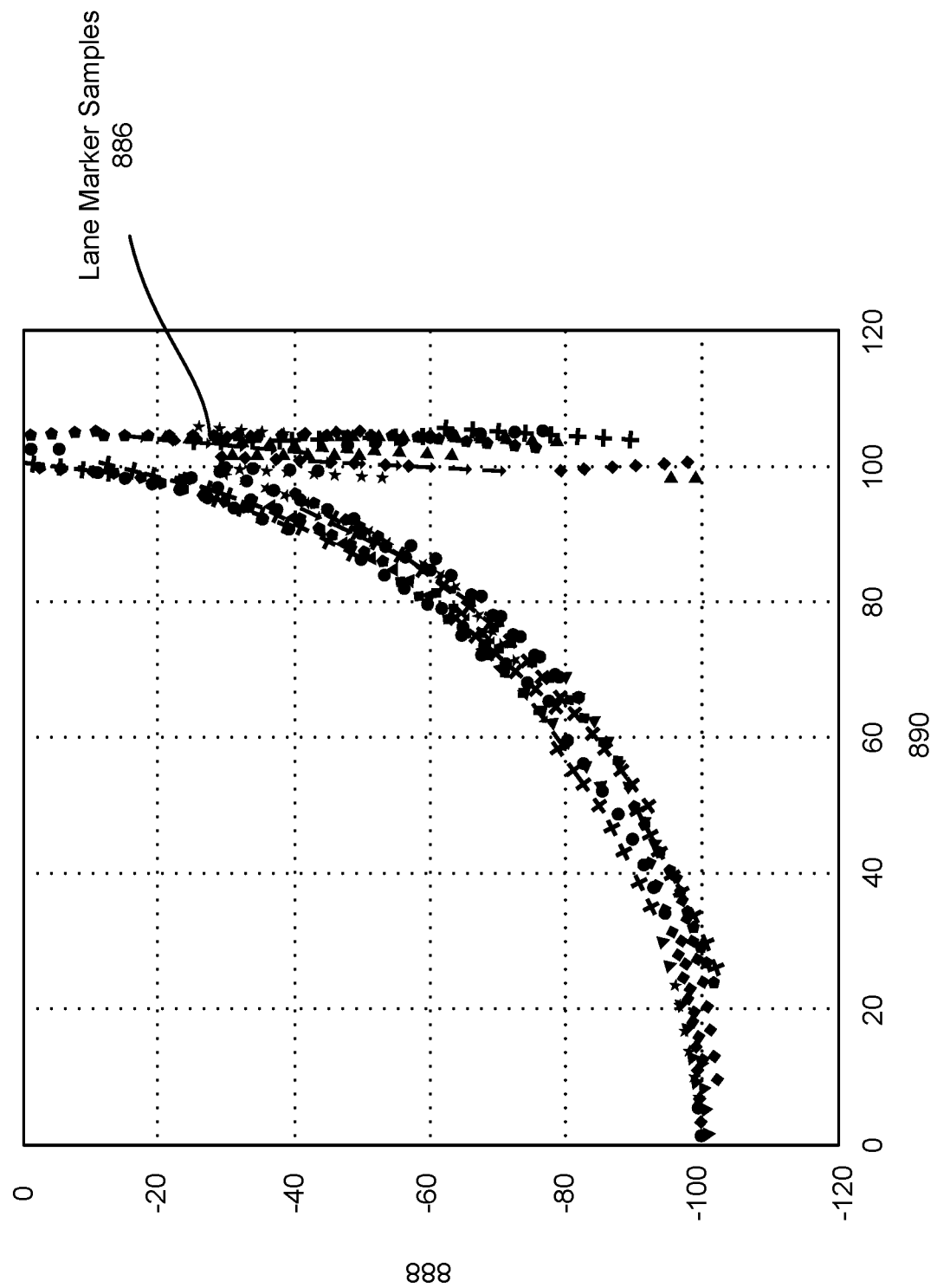
FIG. 8 is diagram illustrating some sample stripes in the X-Y plane.

FIG. 8 is diagram illustrating some sample stripes in the X-Y plane. In particular, FIG. 8 illustrates some lane marker samples 886 from a simulation using the lane markers 780*a-b* described in connection with FIG. 7. The Y (e.g., vertical in FIG. 8) axis 888 is illustrated in meters, and the X (e.g., horizontal in FIG. 8) axis 890 is illustrated in meters. Different symbols are used to illustrate groups of samples. In some approaches, the apparatus 102 described in connection with FIG. 1 may perform spectral clustering of lane markers in accordance with one or more aspects of the following. Pairwise "distances" (e.g., similarity metrics) between stripes may be computed. For distance metrics, a baseline may be to use a minimum distance between two stripes (mindist) (e.g., find where the stripes are closest to each other and use that distance). Each stripe may be sampled finely. For a pair of stripes, the number of pairwise points that are within a threshold may be counted (e.g., count). This is high when stripes run alongside/on top of each other for all or part of the way. In some approaches, the above two may be combined, perhaps with a kernel function. For example, count*exp(−K mindist$^2$). The distance may be mapped to the similarity score in [0, 1]. In a baseline approach, if mindist<2 m, then the similarity metric may be 1, else 0 (e.g., indicator L(.)) Spectral clustering as for sign clustering may be performed in some approaches.

Hierarchical clustering for lane markers may also be performed in some approaches. For example, the apparatus 102 may cluster in two or three stages. For instance, starting with 200 stripes, the apparatus 102 may determine 75 clusters. The apparatus 102 may further reduce the clusters to 25, and then to 12. A second and/or third round of clustering on the "point cloud" may be given by the previous round. Alternatively, after each clustering stage, the apparatus 102 may fit a new stripe to the cluster and the next clustering stage may work based on the new splines. The distance may be mapped to similarity score in [0, 1]. In a baseline approach, if mindist<2 m, then the similarity metric is 1, else 0 (indicator L(.)). Spectral clustering may be applied as for sign clustering. The number of clusters may increase or decrease at each level, for example.

Figure 9:
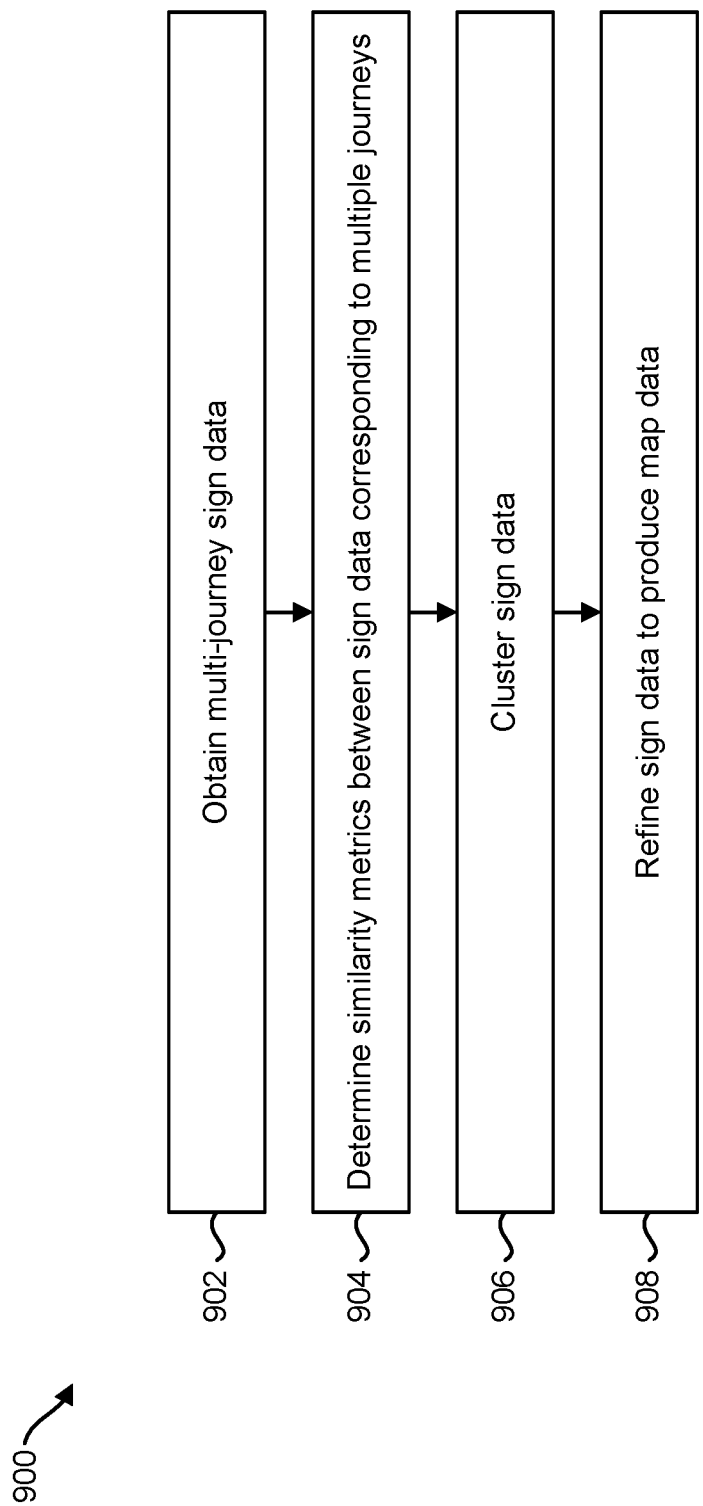
FIG. 9 is a flow diagram illustrating a more specific configuration of a method for mapping based on multi-journey data.

FIG. 9 is a flow diagram illustrating a more specific configuration of a method 900 for mapping based on multi-journey data. The method 900 may be performed by the apparatus 102 described in connection with FIG. 1. The apparatus 102 may obtain 902 multi-journey sign data. This may be accomplished as described in connection with one or more of FIGS. 1 and 3. For example, the apparatus 102 may capture, determine and/or may receive multi-journey sign data.

The apparatus 102 may determine 904 one or more similarity metrics between sign data corresponding to multiple journeys. This may be accomplished as described in connection with one or more of FIGS. 1-3. For example, the apparatus 102 may determine a similarity metric that indicates a distance between signs (e.g., sign corners, sign centers, etc.) from sign data of multiple journeys. In some approaches, similarity metrics may be determined 904 for pairs of sign observations within an association tile.

The apparatus 102 may cluster 906 sign data (e.g., one or more signs from the multi-journey sign data) to produce one or more object clusters. This may be accomplished as described in connection with one or more of FIGS. 1-4B and 6. Clustering 906 sign data (e.g., signs) may be based on the one or more similarity metrics. In some configurations, clustering may include hierarchical clustering and/or constrained spectral clustering. In some approaches, the sign data (e.g., signs) may be clustered based on sign shape (e.g., semantic data indicating whether a sign is rectangular, diamond shaped, triangular, octagonal, etc.). In some approaches, hierarchical clustering may be performed, where a distance parameter (e.g., critical distance) is changed for each stage or level of clustering. For example, similarity metrics may be determined 904 with a first distance parameter (e.g., a larger distance parameter) and clustering 906 may be performed at a first level. Then, similarity metrics may be determined 904 with a second distance parameter (e.g., a smaller distance parameter) and clustering 906 may be performed at a second level, etc. In some approaches, image features may be utilized to perform a level of clustering 906. Spectral clustering may additionally or alternatively be performed in some approaches.

The apparatus 102 may refine 908 the sign data to produce map data. This may be accomplished as described in connection with one or more of FIGS. 1 and 3. For example, the apparatus 102 may perform multi-journey bundle adjustment based on the sign clusters to produce map data. Additionally or alternatively, the apparatus 102 may refine the map data. For instance, the apparatus 102 may perform bundle adjustment to refine map data (e.g., object pose information and/or camera pose information corresponding to a map) and/or may update the map based on object (e.g., sign) data and/or subsequent object data.

Figure 10:
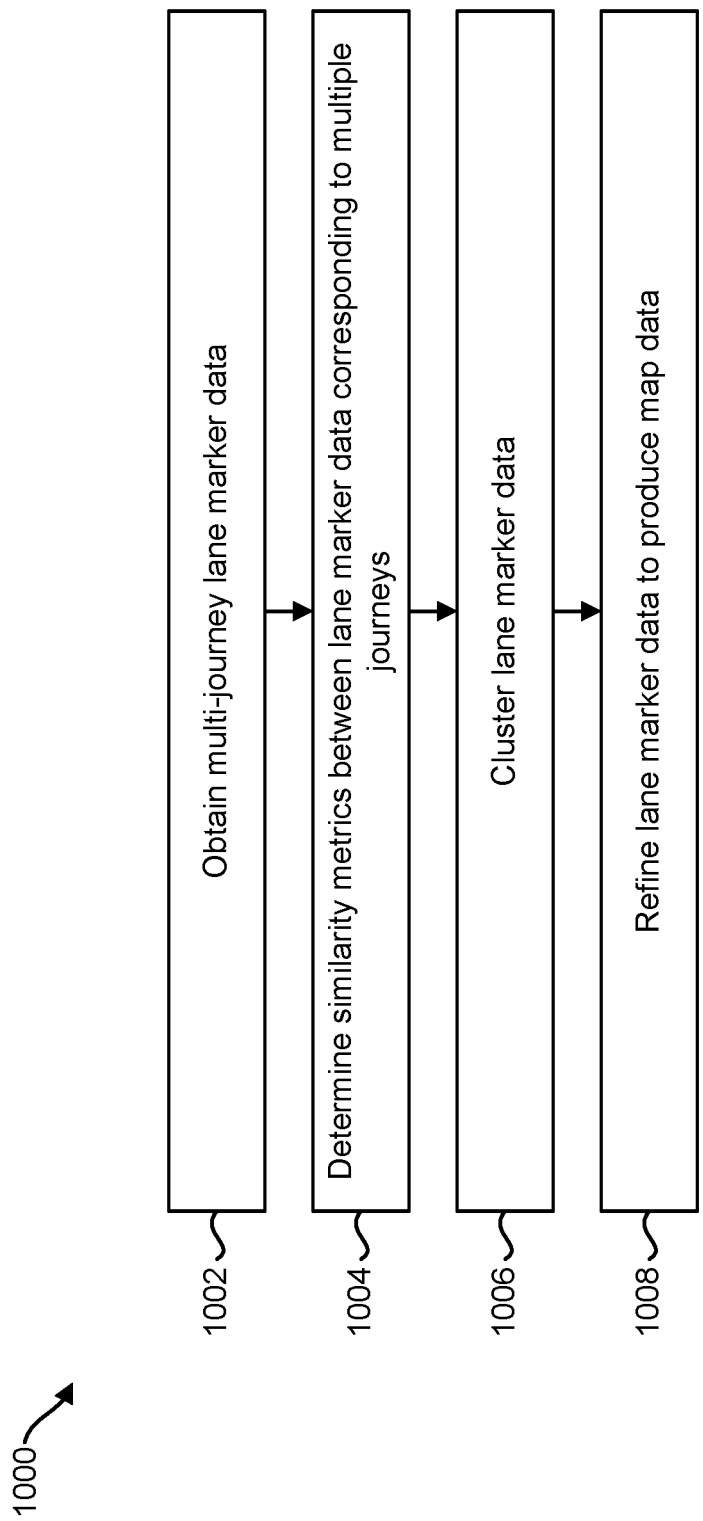
FIG. 10 is a flow diagram illustrating another more specific configuration of a method for mapping based on multi-journey data.

FIG. 10 is a flow diagram illustrating another more specific configuration of a method 1000 for mapping based on multi-journey data. The method 1000 may be performed by the apparatus 102 described in connection with FIG. 1. The apparatus 102 may obtain 1002 multi-journey lane marker data. This may be accomplished as described in connection with one or more of FIGS. 1 and 3. For example, the apparatus 102 may capture, determine and/or may receive multi-journey lane marker data.

The apparatus 102 may determine 1004 one or more similarity metrics between lane marker data corresponding to multiple journeys. This may be accomplished as described in connection with one or more of FIGS. 1-3. For example, the apparatus 102 may determine a similarity metric that indicates a distance between lane markers from lane marker data of multiple journeys. In some approaches, similarity metrics may be determined 1004 for lane marker observations within an association tile.

The apparatus 102 may cluster 1006 lane marker data (e.g., one or more lane markers from the multi-journey lane marker data) to produce one or more object clusters. This may be accomplished as described in connection with one or more of FIGS. 1-3 and 8. Clustering 1006 lane marker data (e.g., lane markers) may be based on the one or more similarity metrics. In some configurations, clustering may include hierarchical clustering and/or constrained spectral clustering. In some approaches, hierarchical clustering may be performed, where a similarity metric is changed for each stage or level of clustering. Spectral clustering may additionally or alternatively be performed in some approaches.

The apparatus 102 may refine 1008 the lane marker data to produce map data. This may be accomplished as described in connection with one or more of FIGS. 1 and 3. For example, the apparatus 102 may perform multi-journey bundle adjustment based on the lane marker clusters to produce map data. Additionally or alternatively, the apparatus 102 may refine the map data. For instance, the apparatus 102 may perform bundle adjustment to refine map data (e.g., object pose information and/or camera pose information corresponding to a map) and/or may update the map based on object (e.g., lane marker) data and/or subsequent object data.

Figure 11:
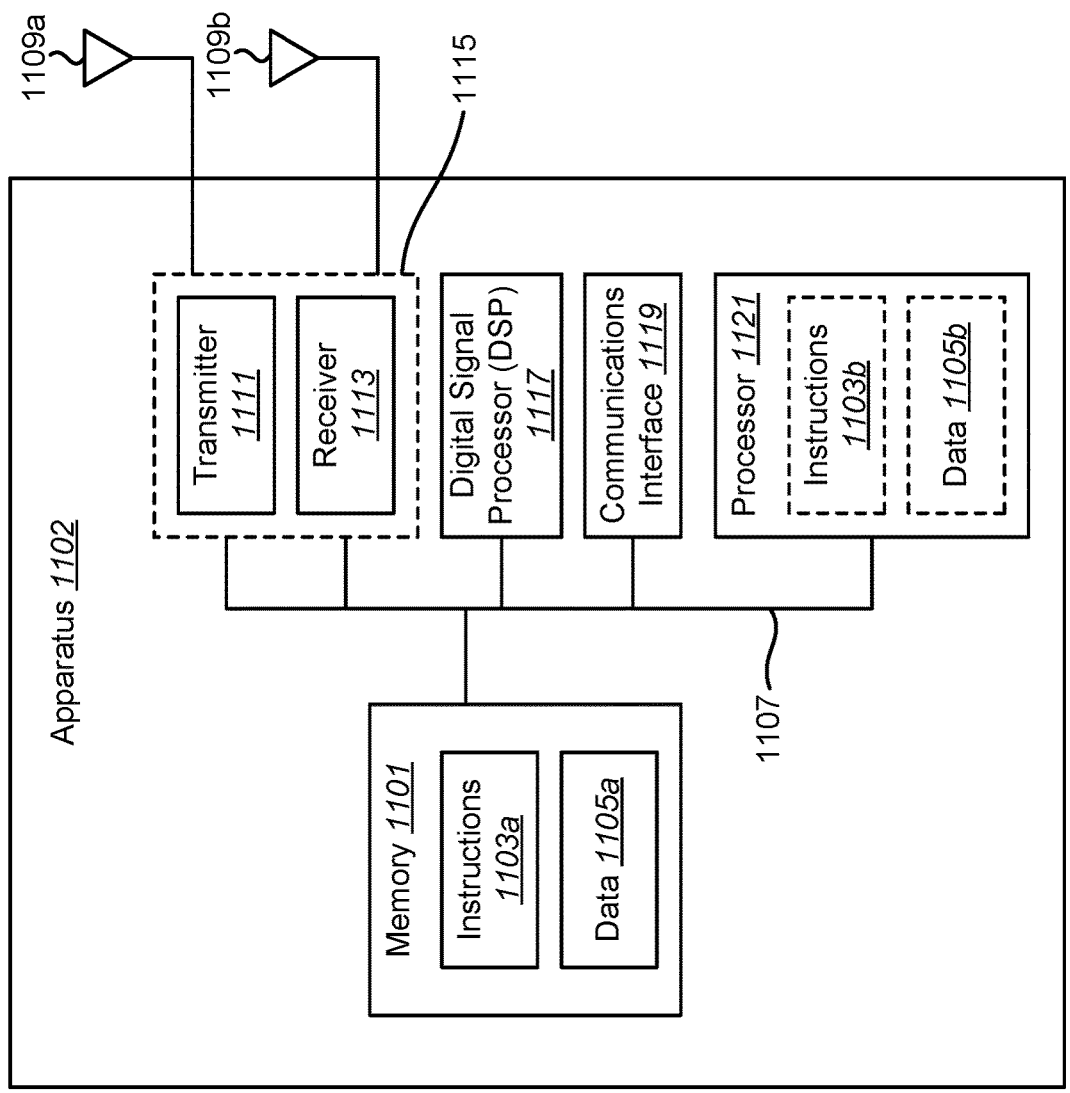
FIG. 11 illustrates certain components that may be included within an apparatus configured to implement various configurations of the systems and methods disclosed herein.

FIG. 11 illustrates certain components that may be included within an apparatus 1102 configured to implement various configurations of the systems and methods disclosed herein. Examples of the apparatus 1102 may include servers, cameras, video camcorders, digital cameras, cellular phones, smart phones, computers (e.g., desktop computers, laptop computers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), healthcare equipment, gaming consoles, personal digital assistants (PDAs), set-top boxes, etc. The apparatus 1102 may be implemented in accordance with one or more of the apparatuses described herein.

The apparatus 1102 includes a processor 1121. The processor 1121 may be a general purpose single- or multi-chip microprocessor (e.g., an ARM), a special purpose microprocessor (e.g., a digital signal processor (DSP)), a microcontroller, a programmable gate array, etc. The processor 1121 may be referred to as a central processing unit (CPU). Although just a single processor 1121 is shown in the apparatus 1102, in an alternative configuration, a combination of processors (e.g., an ARM and DSP) could be implemented.

The apparatus 1102 also includes memory 1101. The memory 1101 may be any electronic component capable of storing electronic information. The memory 1101 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1105a and instructions 1103a may be stored in the memory 1101. The instructions 1103a may be executable by the processor 1121 to implement one or more of the methods, procedures, steps, and/or functions described herein. Executing the instructions 1103a may involve the use of the data 1105a that is stored in the memory 1101. When the processor 1121 executes the instructions 1103, various portions of the instructions 1103b may be loaded onto the processor 1121 and/or various pieces of data 1105b may be loaded onto the processor 1121.

The apparatus 1102 may also include a transmitter 1111 and/or a receiver 1113 to allow transmission and reception of signals to and from the apparatus 1102. The transmitter 1111 and receiver 1113 may be collectively referred to as a transceiver 1115. One or more antennas 1109a-b may be electrically coupled to the transceiver 1115. The apparatus 1102 may also include (not shown) multiple transmitters, multiple receivers, multiple transceivers and/or additional antennas.

The apparatus 1102 may include a digital signal processor (DSP) 1117. The apparatus 1102 may also include a communications interface 1119. The communications interface 1119 may allow and/or enable one or more kinds of input and/or output. For example, the communications interface 1119 may include one or more ports and/or communication devices for linking other devices to the apparatus 1102. In some configurations, the communications interface 1119 may include the transmitter 1111, the receiver 1113, or both (e.g., the transceiver 1115). Additionally or alternatively, the communications interface 1119 may include one or more other interfaces (e.g., touchscreen, keypad, keyboard, microphone, camera, etc.). For example, the communication interface 1119 may enable a user to interact with the apparatus 1102.

The various components of the apparatus 1102 may be coupled together by one or more buses, which may include a power bus, a control signal bus, a status signal bus, a data bus, etc. For the sake of clarity, the various buses are illustrated in FIG. 11 as a bus system 1107.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B, and C" or the phrase "at least one of A, B, or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B, and C" or the phrase "one or more of A, B, or C" should be interpreted to mean any of: only A, only B, only C, A and B (but not C), B and C (but not A), A and C (but not B), or all of A, B, and C.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A vehicle, comprising:
   a memory;
   a processor coupled to the memory, wherein the processor is configured to:
   receive first object data collected by the vehicle during a first journey, wherein the first object data represents at least one object;
   transmit the first object data;
   receive map data based on a similarity metric between the at least one object in the first object data and the at least one object represented by an object cluster, wherein the object cluster is generated based on image data received from a plurality of different vehicles; and
   localize the vehicle based on the received map data.

2. The vehicle of claim 1, wherein the processor is configured to:
   receive second object data collected by the vehicle during the first journey;
   transmit the second object data; and
   receive second map data based on the second object data and third object data, wherein the third object data is collected during a second journey traveled by the vehicle.

3. The vehicle of claim 1, wherein the similarity metric is based on a type of the at least one object.

4. The vehicle of claim 3, wherein the similarity metric is based on a sign object type, and wherein a second similarity metric is based on a lane marker object type, and wherein the similarity metric is different than the second similarity metric.

5. The vehicle of claim 1, wherein the object cluster is based on feature points of the object.

6. The vehicle of claim 5, wherein the map data is based on a bundle adjustment that is based on the at least one object cluster.

7. The vehicle of claim 5, wherein the object cluster is based on each of one or more association tiles.

8. The vehicle of claim 5, wherein the first object data comprises at least one of frames, object features, camera pose information, two-dimensional (2D) object location data, three-dimensional (3D) object position data, or 3D object orientation data.

9. The vehicle of claim 1, wherein the map data comprises a map or a map update.

10. The vehicle of claim 8, wherein the at least one object comprises a sign, a lane, a lane marker, or a spline.

11. The vehicle of claim 1, wherein the map data is received after completion of the first journey.

12. The vehicle of claim 8, wherein the map data corresponds to one or more tiles.

13. A method, comprising:
receiving first object data collected by a vehicle during a first journey, wherein the first object data represents at least one object;
transmitting the first object data;
receiving map data based on a similarity metric between the at least one object in the first object data and the at least one object represented by an object cluster wherein the object cluster is generated based on image data received from a plurality of different vehicles; and
localizing the vehicle based on the received map data.

14. The method of claim 13, further comprising:
receiving second object data collected by the vehicle during the first journey;
transmitting the second object data; and
receiving second map data based on the second object data and third object data, wherein the third object data is collected during a second journey traveled by the vehicle.

15. The method of claim 13, wherein the similarity metric is based on a type of the at least one object.

16. The method of claim 15, wherein the similarity metric is based on a sign object type, and wherein a second similarity metric is based on a lane marker object type, and wherein the similarity metric is different than the second similarity metric.

17. The method of claim 13, wherein the object cluster is based on feature points of the object.

18. The method of claim 17, wherein the map data is based on a bundle adjustment that is based on the at least one object cluster.

19. The method of claim 17, wherein the object cluster is based on each of one or more association tiles.

20. The method of claim 17, wherein the first object data comprises at least one of frames, object features, camera pose information, two-dimensional (2D) object location data, three-dimensional (3D) object position data, or 3D object orientation data.

21. The method of claim 13, wherein the map data comprises a map or a map update.

22. The method of claim 20, wherein the at least one object comprises a sign, a lane, a lane marker, or a spline.

23. The method of claim 13, wherein the map data is received after completion of the first journey.

24. The method of claim 20, wherein the map data corresponds to one or more tiles.

25. An apparatus, comprising:
a memory;
a processor coupled to the memory, wherein the processor is configured to:
receive first object data from a vehicle, wherein the first object data is collected by the vehicle during a first journey, wherein the first object data represents at least one object; and
transmit map data based on a similarity metric between the at least one object in the first object data and the at least one object represented by an object cluster wherein the object cluster is generated based on image data received from a plurality of different vehicles.

26. The apparatus of claim 25, wherein the processor is configured to:
receive, from the vehicle, second object data collected by the vehicle during the first journey; and
send second map data based on the second object data and third object data, wherein the third object data is collected during a second journey.

27. The apparatus of claim 25, wherein the similarity metric is based on a type of the at least one object.

28. The apparatus of claim 27, wherein the similarity metric is based on a sign object type, and wherein the processor is configured to determine a second similarity metric based on a lane marker object type, and wherein the similarity metric is different than the second similarity metric.

29. The apparatus of claim 25, wherein the processor is configured to
generate the object cluster based on feature points of the object.

30. The apparatus of claim 29, wherein the processor is configured to perform bundle adjustment based on the object cluster.

31. The apparatus of claim 29, wherein the processor is configured to perform clustering within each of one or more association tiles.

32. The apparatus of claim 25, wherein the first object data comprises at least one of frames, object features, camera pose information, two-dimensional (2D) object location data, three-dimensional (3D) object position data, or 3D object orientation data.

33. The apparatus of claim 25, wherein the map data comprises a map or a map update.

34. The apparatus of claim 32, wherein the at least one object comprises a sign, a lane, a lane marker, or a spline.

35. The apparatus of claim 25, wherein the map data is transmitted after completion of the first journey.

36. The apparatus of claim 32, wherein the map data corresponds to one or more tiles.

37. A method, comprising:
receiving first object data from a vehicle, wherein the first object data is collected by the vehicle during a first journey, wherein the first object data represents at least one object; and
transmitting map data based on a similarity metric between the at least one object in the first object data and the at least one object represented by an object cluster, wherein the object cluster is generated based on image data received from a plurality of different vehicles.

38. The method of claim 37, further comprising:
receiving, from the vehicle, second object data collected by the vehicle during the first journey; and
sending second map data based on the second object data and third object data, wherein the third object data is collected during a second journey.

39. The method of claim 37, wherein the similarity metric is based on a type of the at least one object.

40. The method of claim 39, wherein the similarity metric is based on a sign object type, and wherein the method further comprises determining a second similarity metric based on a lane marker object type, and wherein the similarity metric is different than the second similarity metric.

41. The method of claim 37, further comprising
generating the object cluster based on feature points of the object.

42. The method of claim 41, further comprising performing bundle adjustment based on the object cluster.

43. The method of claim 41, further comprising performing clustering within each of one or more association tiles.

44. The method of claim 37, wherein the first object data comprises at least one of frames, object features, camera pose information, two-dimensional (2D) object location data, three-dimensional (3D) object position data, or 3D object orientation data.

45. The method of claim 37, wherein the map data comprises a map or a map update.

46. The method of claim 44, wherein the at least one object comprises a sign, a lane, a lane marker, or a spline.

47. The method of claim 37, wherein the map data is transmitted after completion of the first journey.

48. The method of claim 44, wherein the map data corresponds to one or more tiles.

49. The vehicle of claim 12, wherein the object cluster is generated using a hierarchical clustering process.

50. The method of claim 24, further comprising generating the object cluster using a hierarchical clustering process.

51. The apparatus of claim 36, wherein the object cluster is generated using a hierarchical clustering process.

52. The method of claim 48, further comprising generating the object cluster using a hierarchical clustering process.

* * * * *